United States Patent [19]
Buus

[11] Patent Number: 5,493,497
[45] Date of Patent: Feb. 20, 1996

[54] MULTIAXIS REDUNDANT FLY-BY-WIRE PRIMARY FLIGHT CONTROL SYSTEM

[75] Inventor: Henning Buus, Woodinville, Wash.

[73] Assignee: The Boeing Company, Seattle, Wash.

[21] Appl. No.: 893,339

[22] Filed: Jun. 3, 1992

[51] Int. Cl.⁶ .................................. B64C 13/00
[52] U.S. Cl. .................. 364/434; 318/564; 244/194
[58] Field of Search .................................. 364/433, 434, 364/428; 318/564; 244/194; 91/363 A

[56] References Cited

U.S. PATENT DOCUMENTS

| | | | |
|---|---|---|---|
| 2,821,068 | 1/1958 | Orloff et al. | 60/97 |
| 3,138,002 | 6/1964 | Ernst et al. | 60/52 |
| 3,149,272 | 9/1964 | Dendy | 318/28 |
| 3,512,061 | 5/1970 | Watson et al. | 318/18 |
| 3,679,156 | 7/1972 | Redmond, Jr. | 244/194 |
| 3,719,878 | 3/1973 | Ferguson et al. | 318/565 |
| 4,130,241 | 12/1978 | Meredith et al. | 235/307 |
| 4,236,685 | 12/1980 | Kissel | 244/223 |
| 4,345,191 | 8/1982 | Takats et al. | 318/564 |
| 4,363,098 | 12/1982 | Buus et al. | 364/434 |
| 4,422,180 | 12/1983 | Wendt | 455/603 |
| 4,464,661 | 8/1984 | Redmond | 340/960 |
| 4,470,116 | 9/1984 | Ratchford | 364/424 |
| 4,472,780 | 9/1984 | Chenoweth et al. | 364/424 |
| 4,580,210 | 4/1986 | Nordstrom | 364/190 |
| 4,594,537 | 6/1986 | Arifian et al. | 318/564 |
| 4,598,890 | 7/1986 | Herzog et al. | 244/230 |
| 4,644,538 | 2/1987 | Cooper et al. | 371/9 |
| 4,649,484 | 3/1987 | Herzog et al. | 364/424 |
| 4,723,214 | 2/1988 | Frei | 364/434 |
| 4,785,453 | 11/1988 | Chandran et al. | 371/68 |
| 4,807,516 | 2/1989 | Takats | 91/363 A |
| 4,849,893 | 7/1989 | Page et al. | 364/434 |
| 5,036,469 | 7/1991 | Pelton | 364/428 |

FOREIGN PATENT DOCUMENTS 0152714 4/1987 France.

OTHER PUBLICATIONS

The Seattle Times—'Best test flight ever' by Byron Acohido and Polly Lane.
Seat, J. C. et al., "A Microprocessor System for Flight Control Research", Conference Proceedings of the IEEE 1979 National Aerospace and Electronics Conference NAECON 1979, Dayton, OH (15–17 May 1979).
Prepared by Oeder, S. S., "Avionics Requirements for All Weather Landing of Advanced SST's", vol. III, Specific Problems of an SST and Related Technological Trends, Prepared Under NASA Contract, NA824124 for NASA—Ames Research Center, Moffett Field, CA (Apr. 1967).

*Primary Examiner*—Kevin J. Teska
*Assistant Examiner*—Dan Fiul
*Attorney, Agent, or Firm*—Christensen, O'Connor, Johnson & Kindness

[57] ABSTRACT

A redundant, multi-channel fly-by-wire control system for use in an aircraft is disclosed. The system includes a left flight control channel (60), a center flight control channel (80) and a right flight control channel (90). Each control channel is capable of flying the aircraft in the event the other two channels fail. Included within each control channel is an actuator controller electronics unit (ACE (62, 82, 92)), which transmits a series of pilot control transducer signals to a set of primary flight computers (64, 84, and 94). The primary flight computers combine the pilot control transducer signals with data obtained from an air data and inertial reference unit (145) to generate a set of flight surface commands. Each ACE selects a set of flight surface commands to control the movement of a set of flight control surfaces on the aircraft.

26 Claims, 11 Drawing Sheets

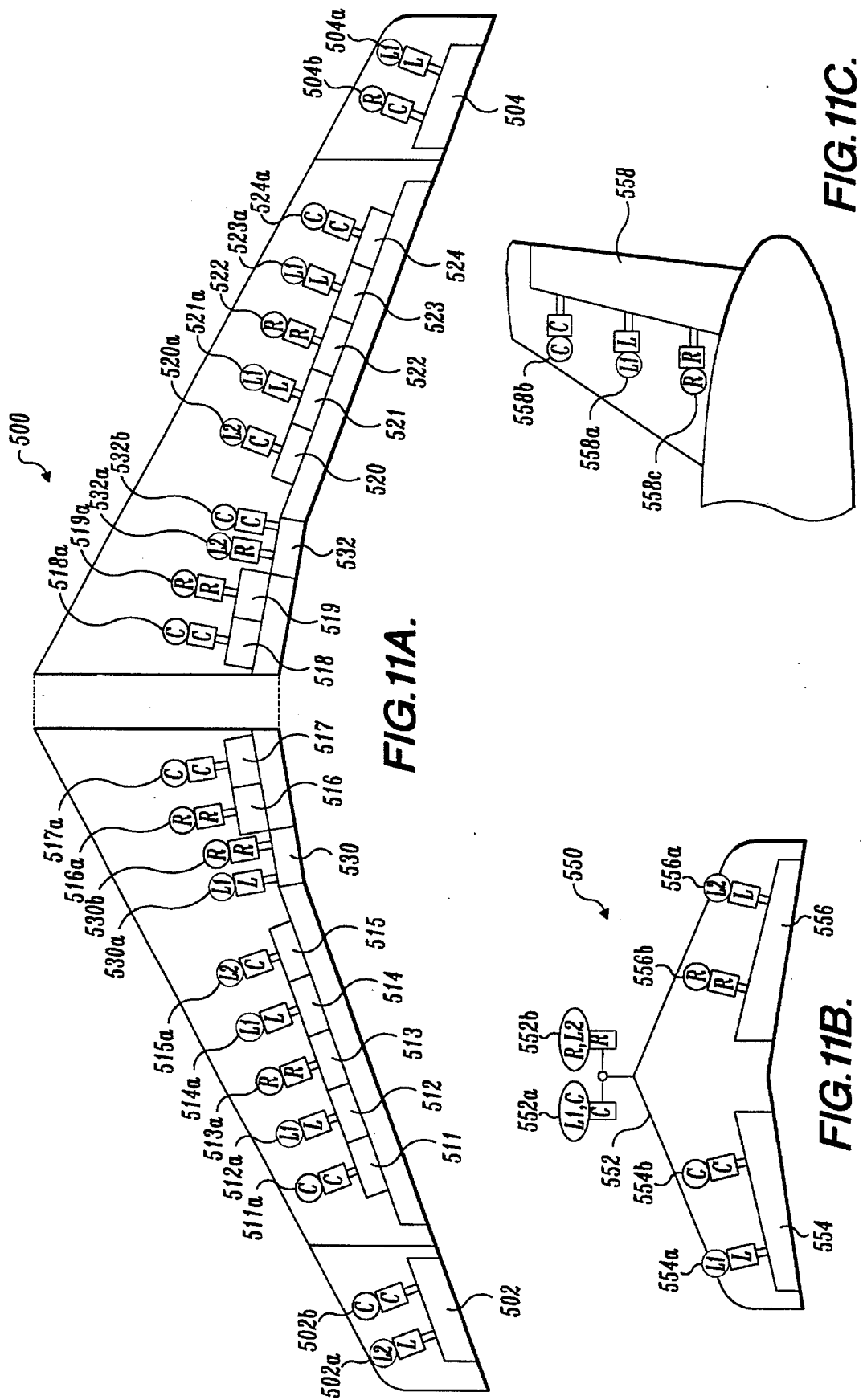

MULTIAXIS REDUNDANT FLY-BY-WIRE PRIMARY FLIGHT CONTROL SYSTEM

FIELD OF THE INVENTION

The present invention generally relates to aircraft control systems and, in particular, to redundant fly-by-wire control systems.

BACKGROUND OF THE INVENTION

Prior to the advent of fly-by-wire technology, the flight control surfaces on a commercial aircraft were controlled using a complex system of cables and mechanical controls as the primary control path. Such a prior art control system is partially illustrated in FIG. 1. In this type of control system, a pilot's control commands are transmitted from a pair of pilot controls 10 to an individual flight control surface 20 through a series of interconnected cables 12. The cables 12 move one or more valves that control a plurality of hydraulic actuators 15, which in turn move the control surface 20. The cables 12 provide a direct mechanical coupling between the pilot controls 10 and the controlled flight control surface 20. A plurality of strategically placed jam override devices 17 allow continued safe operation of the system in the event a cable becomes jammed.

An electronics bay provides enhanced control functions to the system, by controlling several electrical or electrohydraulic activators. These actuators enhance the control commands input by the pilot based on the flight conditions of the aircraft. Examples of such electro-hydraulic actuators include an outboard aileron lockout mechanism to prevent movement of the aircraft's ailerons at high speed, an aileron droop mechanism 19, which droops the inboard ailerons as a function of flap position, etc. Other servo actuators include a series of autopilot servo actuators 14 which implement auto-pilot commands from an autopilot computer included in the electronics bay.

The prior art control system shown in FIG. 1 has numerous drawbacks that limit its use in modern aircraft. The first drawback with such a system is its high cost of maintenance. The electro-hydraulic actuators, often numbering more than forty on a large aircraft, present a formidable maintenance challenge. Each of these devices is embedded within a complex routing of cables 12 that extends throughout the aircraft and therefore even simple repairs can be labor intensive.

A second drawback of the prior art control system is the difficulty in implementing modern control laws that require a computer to control the aircraft. Since the introduction of these earlier flight control systems, advanced control laws have been developed which, among other things, increase aircraft stability as well as control the speed, rate of climb and descent, banking angles, etc. These control laws are difficult to incorporate into a mechanical control system without a substantial increase in system complexity. Finally, the prior art control system is inherently heavy. In the design of aircraft, it is always desirable to reduce tare weight if it can be done without reducing aircraft safety. Therefore, in order to overcome these and other limitations of prior art flight control systems, modern aircraft are being designed to incorporate fly-by-wire technologies.

In contrast to the mechanical flight control system shown in FIG. 1, a simplified diagram of a fly-by-wire (FBW) system according to the present invention is shown in FIG. 2. In a fly-by-wire system, there is no direct mechanical coupling between the pilot controls 10 and a flight control surface 20. Instead of using cables, a fly-by-wire system includes a set of pilot control transducers 22, which sense the position of the controls 10 and generate electrical signals proportional to the position of the pilot controls 10. The electrical signals are transmitted to an electronics bay 24, where they are combined with other airplane data to produce a flight control surface command that controls the movement of a hydraulic actuator 26 that moves the flight control surfaces 20. A pair of pilot controls 10 are connected by a jam override device 34 so that normally both controllers move together. However, in the event that one of the pilots controls becomes stuck, or jammed, the other pilot control can be freed for use by applying force to the jam override device 34 sufficient to uncouple the two controllers.

Because safety is always a high priority in the aircraft industry, fly-by-wire systems usually include redundant components so that if one component of the system fails, a pilot can still safely control the aircraft. Such redundancy is usually provided on axis-by-axis basis. For example, some prior art fly-by-wire architectures have separate systems that control the movement of the aircraft in each of the roll, pitch and yaw axes.

Each axis control system typically included a primary flight computer and a back-up flight computer that only control movement of the aircraft in the particular axis. If the primary flight computer that controls the roll axis were to fail, the back-up computer would engage to control the roll of the aircraft. Similarly, the pitch and yaw axis systems would each include a primary and back-up flight computer. However, if the back-up computer in an axis channel were to fail, the computers in the other channels could not function to fly the aircraft in that axis. Therefore, a need exists for an integrated fly-by-wire system to reduce the possibility that a failure in one part of the system would leave an aircraft unable to fly safely.

A need also exists for a fly-by-wire system that is divided into a series of independent control channels wherein each control channel within the system is substantially isolated from the other control channels. Thus, a malfunction occurring in one channel does not affect the continued operation of the remaining channels.

Furthermore, a need exists for a fly-by-wire system including a plurality of control channels that are designed such that a failure of one part of a control channel will not affect that control channel's ability to safely fly the aircraft.

Finally, a need exists for a fly-by-wire control system wherein the pilot can fly the aircraft without the assistance of a flight control computer if all the flight control computers included in the system should fail.

SUMMARY OF THE INVENTION

The present invention comprises a multiply redundant fly-by-wire control system for an aircraft. The system comprises a set of pilot controls and a plurality of pilot control transducers connected to the set of pilot controls. Each pilot control transducer generates a position control signal that is proportional to a position of one of the pilot controls. A plurality of means for generating flight control surface commands receive the position control signals and combine them with data obtained from an air data and inertial reference system to generate a set of flight control surface commands. A plurality of actuator controller units control the movement of a set of flight control surfaces on the aircraft in response to the set of flight control surface commands received from the means for generating flight control surface commands. The set of flight control surfaces directly controlled by one of the actuator controller units is sufficient to fly the aircraft in the event the remaining actuator controller units fail. Each actuator controller unit is also capable of controlling the set of flight control surfaces in response to the position control signals generated by the plurality of pilot control transducers in the event that the means for generating flight control surface commands fail. Included within each actuator controller unit are means for selecting a specific set of flight control surface commands to control the movement of the set of flight control surfaces. Each actuator controller unit further includes a plurality of servo loop monitors that determine whether a plurality of servo loops, that control the movement of a set of flight control surfaces, are operating properly.

BRIEF DESCRIPTION OF THE DRAWINGS

FIG. 11A is a diagram showing which actuator controller electronics units and hydraulic systems included in the fly-by-wire system are used to control the flight control surfaces located on a pair of aircraft wings;

FIG. 11B is a diagram showing which actuator controller electronics units and hydraulic systems are used to control the flight control surfaces on an aircraft elevator; and FIG. 11C is a diagram showing which actuator controller electronics units and hydraulic systems are used to control an aircraft rudder.

DETAILED DESCRIPTION OF THE PREFERRED EMBODIMENT

Figure 3:
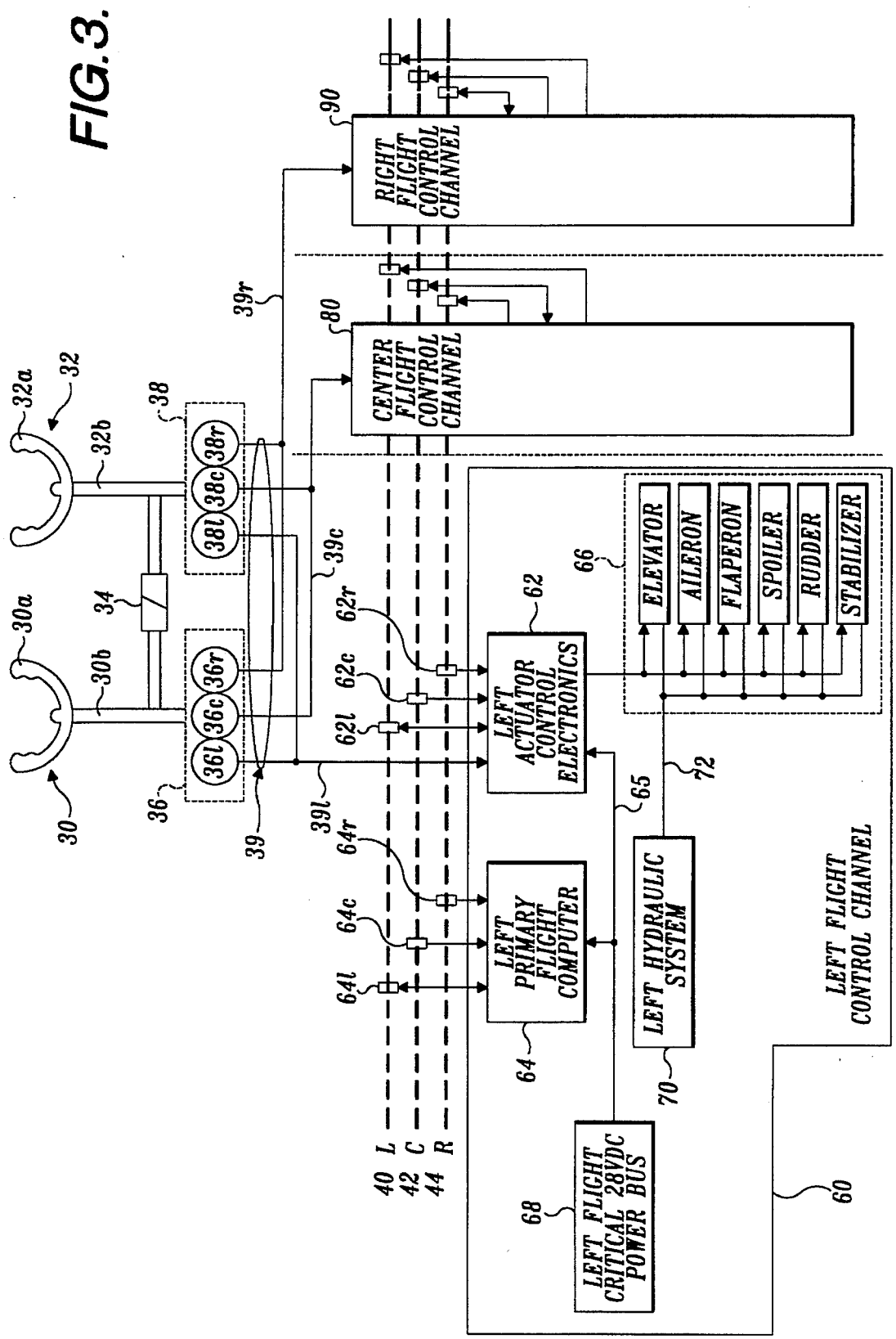
FIG. 3 is a block diagram of the fly-by-wire control system according to the present invention.

A block diagram of the architecture of a fly-by-wire system according to the present invention is shown in FIG. 3. The fly-by-wire system is divided into independent and isolated flight control channels, including a left flight control channel 60, a center flight control channel 80 and a right flight control channel 90. These control channels are completely and electrically isolated from each other such that a failure in one of the channels does not adversely affect the operation of the other channels. As will be described in detail below, each flight control channel of the fly-by-wire system operates a selected set of the aircraft's flight control surfaces such that a pilot can fly the aircraft using only one channel.

Figure 1:
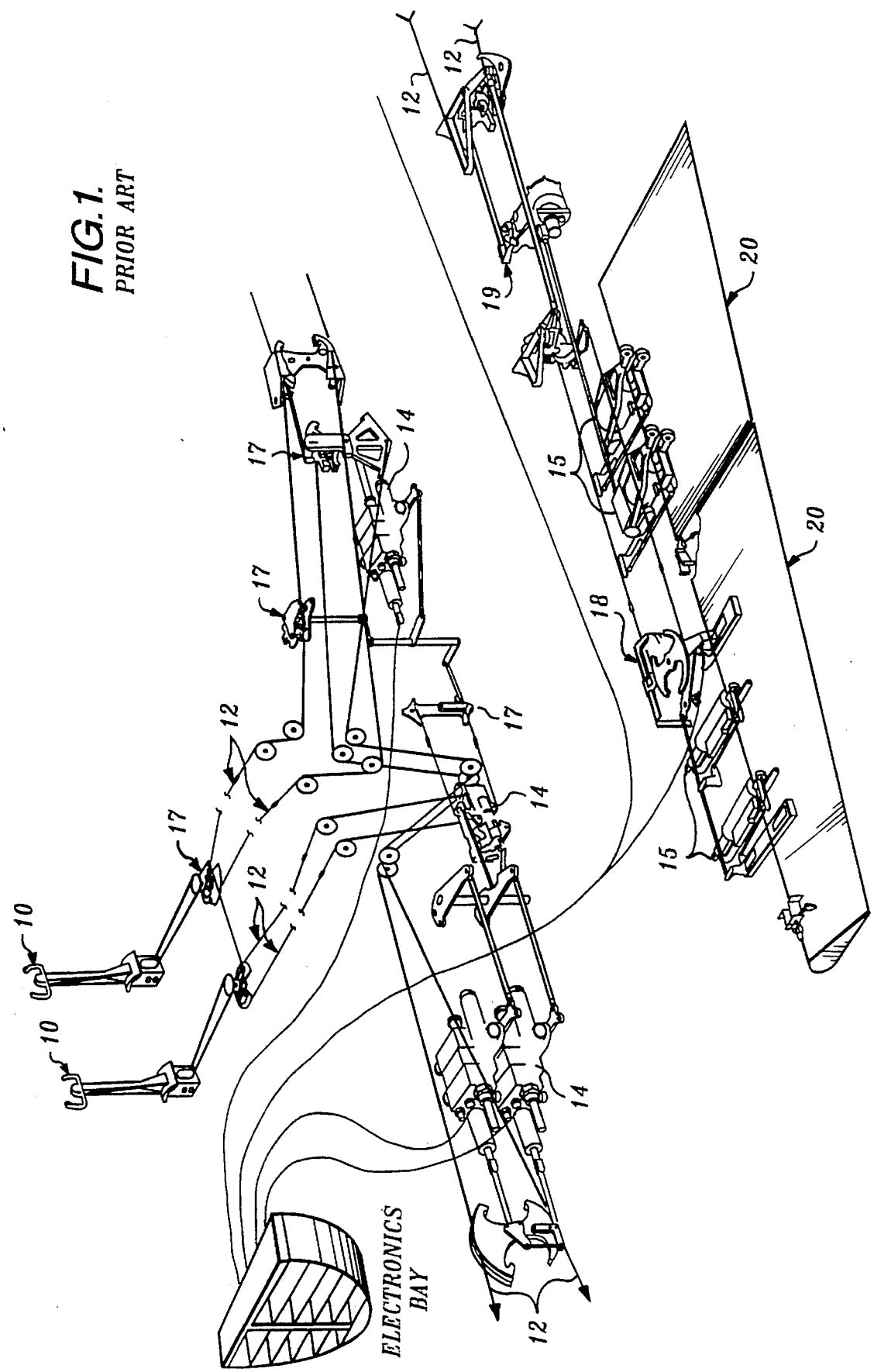
FIG. 1 is a schematic diagram of a prior art, cable-based, aircraft flight control system.
Figure 2:
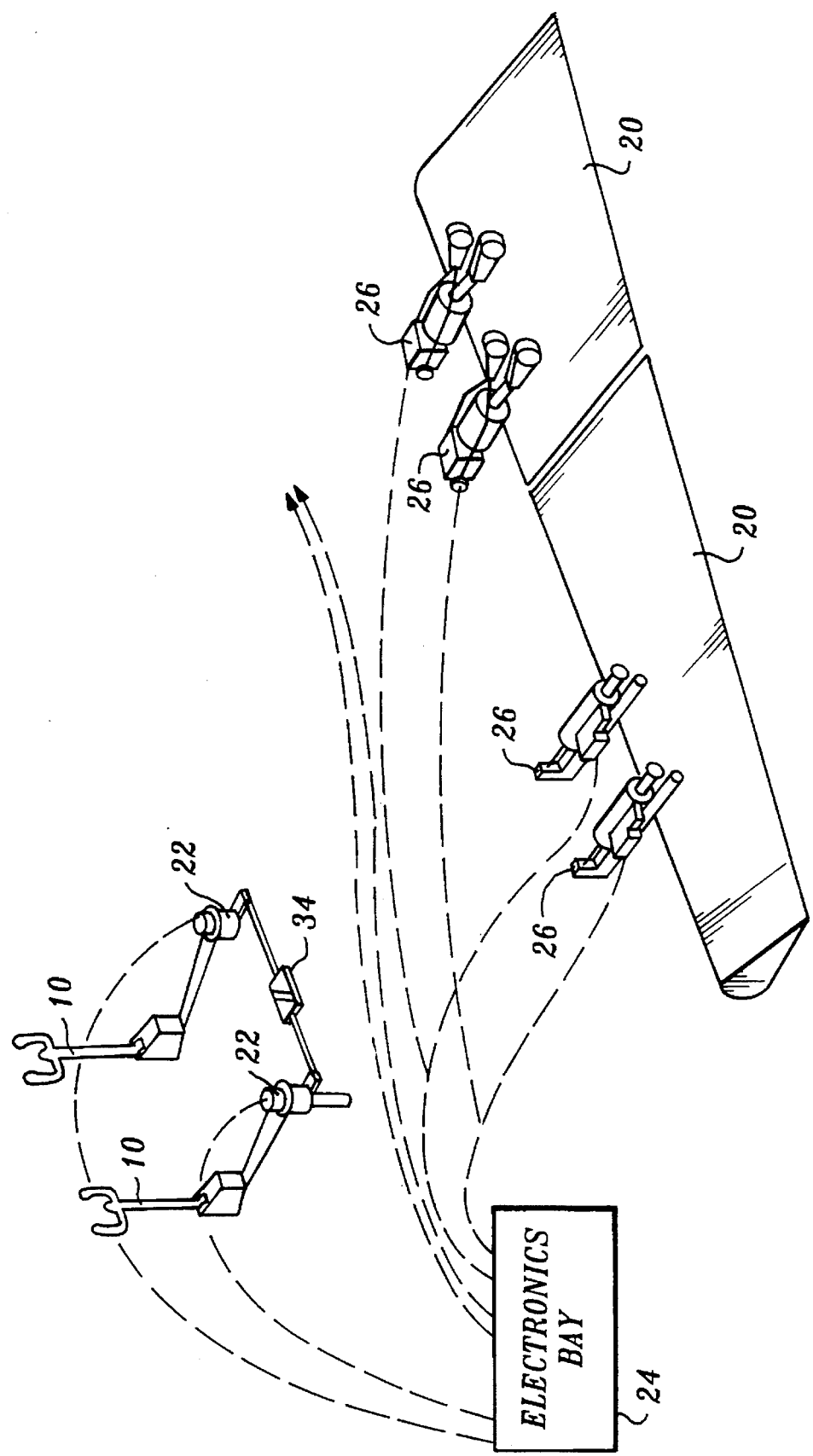
FIG. 2 is a simplified schematic diagram of a fly-by-wire control system according to the present invention.

The fly-by-wire system includes a pilot controller 30 and a copilot controller 32. The pilot controller 30 and copilot controller 32 each comprise a wheel 30a, 32a and a column 30b and 32b, respectively. Also included in the fly-by-wire system (but not shown in FIG. 1) are other pilot controls such as a speed brake controller, a set of pedals and a set of elevator feel actuators. Connecting the pilot controller 30 to the copilot controller 32 is a jam override device 34. In normal operation, the pilot controller 30 and copilot controller 32 move together. However, if the pilot controller 30 or copilot controller 32 becomes jammed, it is possible to free the other by applying sufficient force to the jam override device 34.

Coupled to the pilot controller 30 and the copilot controller 32 is a bank of pilot control transducers 36 and a bank of copilot control transducers 38. Each transducer included within the bank of pilot control transducers 36 and the bank of copilot control transducers 38 generates a plurality of pilot control transducer signals that are proportional to the position of the pilot controller 30 or the copilot controller 32, respectively. In the preferred embodiment, the bank of pilot control transducers 36 includes a left set of pilot control transducers 36l, a center set of pilot control transducers 36c and a right set of pilot control transducers 36r. Similarly, the bank of copilot control transducers 38 preferably includes a left set of pilot control transducers 38l, a center set of pilot control transducers 38c and a right set of pilot control transducers 38r. Each set of pilot control transducers generates pilot control transducer signals, which are proportional to the position of the column or the wheel to which the set of transducers is coupled. The pilot control transducer signals generated by the bank of pilot control transducers 36 and the bank of copilot control transducers 38 are processed by an Actuator Controller Electronics (ACE) 62 in each channel and are transmitted to the other two independent flight control channels (60, 80, and 90) on three separate data busses 40, 42 and 44. In the preferred embodiment, the data busses 40, 42 and 44 are ARINC 629 digital communication links, which are standard in the aircraft industry; however, other types of data communication links could be used.

Because the flight control channels 60, 80, and 90 are virtually identical, the following description of the left flight control channel 60 applies equally to the center and right flight control channels. Therefore, the center and right flight control channels will not be discussed in detail.

The left flight control channel 60 includes a left actuator controller electronics (ACE) unit 62 and a left primary flight computer 64. The left ACE 62 controls the movement of a plurality of hydraulic actuators that control the movement of a set of flight control surfaces 66 that includes pairs of symmetrically located spoilers, an aileron, a flaperon, as well as the hydraulic actuators that control the movement of an elevator, rudder, and stabilizer flight control surface on the aircraft to adjust the attitude of the aircraft in all three directional axes (roll, pitch, and yaw). As will be discussed in further detail, the left ACE 62 controls enough of the flight surfaces on the aircraft so that the pilot can fly the aircraft should the center flight control channel 80 and/or the right flight control channel 90 fail. The other two flight control channels also have a similar fault-tolerant redundant control capability.

The left flight control channel 60 is powered by an independent power bus 68, which supplies power to the left ACE 62 and the left primary flight computer 64 via a set of leads 65. By using independent power busses for each control channel, a failure in one power bus does not affect the operation of the other flight control channels. The left flight control channel 60 also has associated with it a left independent hydraulic system 70, which is used to power the movement of a set of hydraulic actuators (not shown) via a line 72. These actuators in turn move the flight control surfaces included in the set of flight control surfaces 66. By using an independent hydraulic system for each control channel, a failure in one hydraulic system is isolated so that it does not substantially affect more than that single flight control channel.

The pilot control transducer signals generated by the sets of pilot control transducers 36 transducers 36l and 38l are transmitted to the left ACE 62 via leads 39l. Similarly, the pilot control transducer signals generated by the sets of pilot control transducers 36c and 38c are transmitted to the center channel 80 over leads 39c, while pilot control transducer signals generated by the sets of pilot control transducers 36r and 38r are transmitted to the right channel 90 over leads 39r. A set of leads 62l is used by left ACE 62 to transmit and receive data bidirectionally from a left data bus 40, while a set of leads 62c and a set of leads 62r are connected to allow the ACE to receive data only from a center data bus 42, and fight data bus 44, respectively.

After receiving the pilot control transducer signals from the sets of pilot control transducers 36l and 38l, left ACE 62 transmits the signals to the left primary flight computer 64 over the set of leads 62l and the left data bus 40. The left primary flight computer 64 receives the pilot control transducer signals on a set of bidirectional leads 64l. The left primary flight computer generates a series of flight surface commands based on the pilot control transducer signals received from the left ACE 62, the pilot control transducer signals received from the other control channels via the center data bus 42 and the right data bus 44, and data obtained from an air data and inertial reference system (not shown). The set of flight surface commands generated by left primary flight computer 64 is transmitted back to the left ACE 62 over the left data bus 40. Left ACE 62 then controls the movement of the set of hydraulic actuators (not shown), which in turn move the set of flight control surfaces 66 in response to the set of flight surface commands received.

Because left primary flight computer 64 receives pilot control transducer signals from the center flight control channel 80 and from the right flight control channel 90, should one of the sets of pilot control transducers become inoperative, the left primary flight computer 64 can still generate the flight surface commands. Additionally, the left ACE 62 receives sets of flight surface commands generated by the primary flight computers associated with the center flight control channel 80 and the right flight control channel 90. After receiving the flight surface commands from the primary flight computers associated with the other flight control channels, the ACE 62 selects which set of flight surface commands it will use to control the set of flight control surfaces associated with its control channel.

As will be described below, each ACE normally selects the set of flight surface commands generated by the primary flight computer within that ACE's flight control channel. However, before executing the flight surface commands each ACE performs a validity check on the commands to ensure that the primary flight computer associated with the ACE's flight control channel is operating properly. If the validity check indicates that the primary flight computer is not operating properly, then the ACE will select a set of flight control surface commands generated by another primary flight computer for use in controlling the ACE's set of flight control surfaces. Therefore, the left ACE 62 can still control the movement of the set of flight control surfaces 66 in the event that the left primary flight computer 64 or the left data bus 40 fails. Although the above description is directed to the left flight control channel 60, the center flight control channel 80 and the fight flight control channel 90 are substantially identical in operation and fail-safe functionality.

Figure 4:
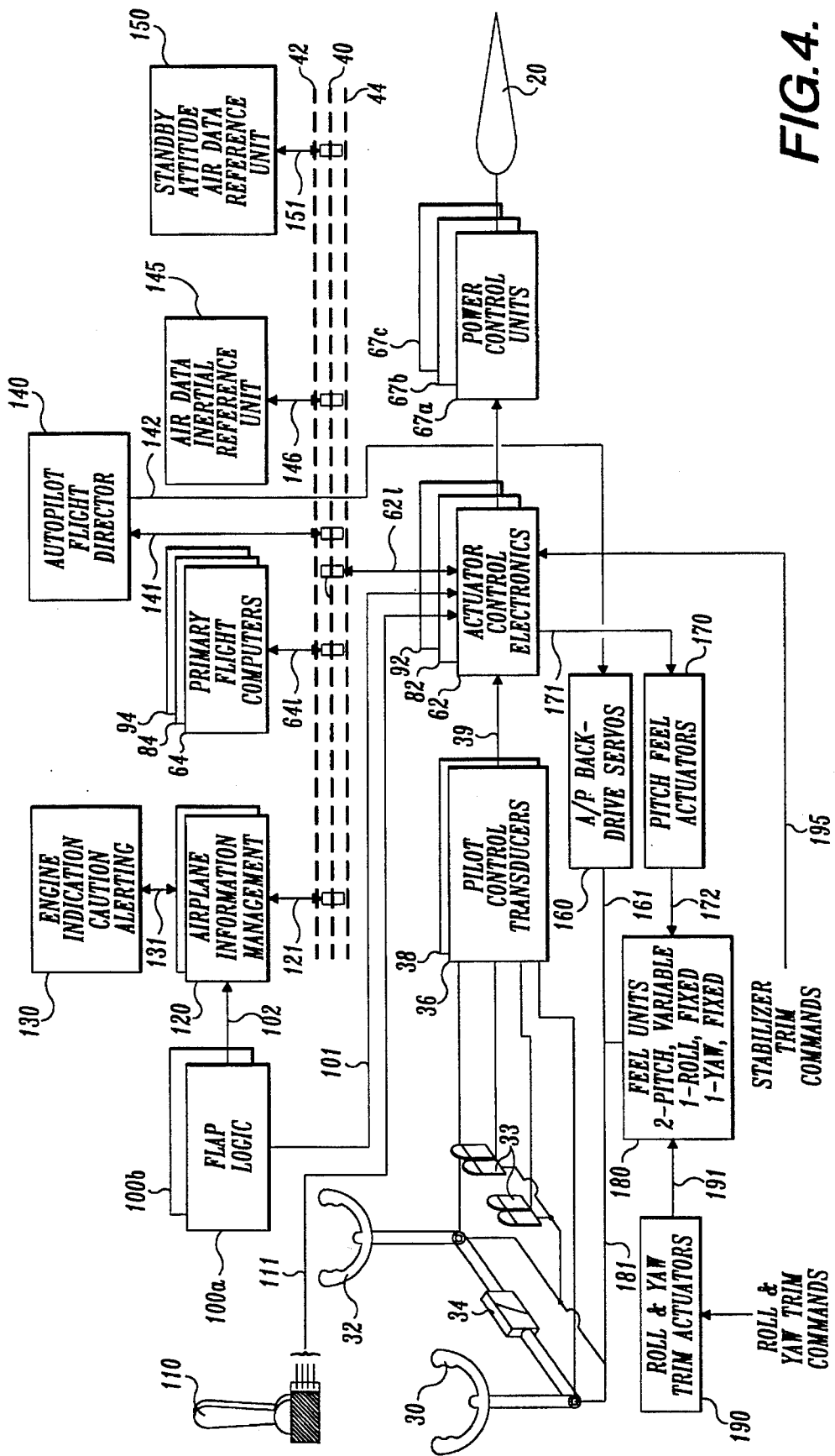
FIG. 4 is a block diagram of the fly-by-wire control system according to the present invention.

FIG. 4 is a functional block diagram showing how the fly-by-wire system according to the present invention interfaces with other avionic systems included on an aircraft. As shown in FIG. 4, the pilot controller 30 and copilot controller 32 are coupled to the banks of pilot control transducers 36 and the bank of copilot control transducers 38, which generate pilot control transducer signals that are proportional to the position of the pilot controller 30 and copilot controller 32. Also shown is a set of pedals 33 used by the pilot and copilot to control the aircraft's rudder (not shown). The pedals 33 are also coupled to the bank of pilot control transducers 36 and the bank of copilot control transducers 38. The pilot control transducer signals generated by the bank of pilot control transducers 36 and the bank of copilot control transducers 38 are transmitted to the plurality of actuator controller electronic units (ACEs) via the leads 39. The pilot control transducer signals generated by banks of pilot control transducers 36 and the bank of copilot control transducers 38 are transmitted from the ACEs 62 to the ACE's associated data bus.

Connected to the three data busses 40, 42 and 44 are three primary flight computers comprising the left primary flight computer 64, which is associated with the left control channel 60, a center primary flight computer 84, which is associated with the center control channel 80, and a right primary flight computer 94, which is associated with the right flight control channel 90. As described above, each primary flight computer 64, 84, 94 receives the pilot control transducer signals from each of the ACEs 62, 82, and 92. The primary flight computers each generate a set of flight surface commands, based on the pilot control transducer signals and on data obtained from an air data and inertial reference unit 145, which is coupled to the data busses 40, 42 and 44 by a set of leads 146. The primary flight computers 64, 84 and 94 then transmit the sets of flight surface commands on the data busses 40, 42 and 44 so that each ACE 62, 82, and 92 receives a set of flight surface commands from each of the primary flight computers and selects a specific set to control a plurality of power control units 67a, 67b, and 67c. Each of the power control units controls the movement of an individual flight control surface 20. As stated above, particular flight control surfaces that are controlled by a single ACE, such as the left ACE 62, are chosen so that any flight control channel of the fly-by-wire system can safely control the flight of the aircraft in the event that one or both of the remaining flight control channels fail.

Each ACE also receives a flap position discrete from a pair of flap logic blocks 100a and 100b over a lead 101. The flap position discrete comprises a signal that corresponds to the physical position of the flap control surfaces of the aircraft and are used by the ACEs to adjust the gain of the pilot control transducer signals generated by the bank of pilot control transducers 36 and the bank of copilot control transducers 38 when the aircraft is flying without the assistance of the primary flight computers, as will be described.

Also shown is a direct mode switch 110 that can be operated by the pilot or copilot to disconnect the ACEs 62, 82, and 92 from the data busses 40, 42, and 44, respectively. If the direct mode switch 110 is activated, the pilot can control the aircraft in a direct analog mode in which the ACEs control the movement of the flight control surfaces without using the flight surface commands generated by the primary flight computers. In this direct analog mode, the pilot must fly the aircraft without the use and benefit of the advanced control laws implemented by the primary flight computers. However, even in the unlikely event in which all the primary flight computers, as well as the air data and inertial reference unit 145, fail, the fly-by-wire control system of the present invention still allows the pilot to safely fly the aircraft.

FIG. 4 also shows the other avionic components included on the aircraft that are in communication with the data busses 40, 42 and 44. An airplane information management system (AIMS) 120 receives signals from an engine indication caution alerting system 130 over a set of leads 131; both systems are coupled to the data busses 40, 42 and 44 via a set of leads 121. The AIMS 120 serves as a multi-purpose computer, which controls the following functions of the aircraft: flight management, the operation of the flight navigation displays, displays indicating the need for onboard maintenance, aircraft communications and collecting data regarding the operation of the engines. Much of the data received and generated by the AIMS 120 is shared with other flight system components by transmitting the data over the data busses 40, 42 and 44. A set of direct leads 102 also provides the AIMS 120 with the flap position discretes generated by the flap logic blocks 100a and 100b.

An autopilot flight director system 140 provides computer control of the aircraft without the need for direct pilot or copilot input. Upon engagement of the autopilot flight director system 140, the primary flight computers generate the flight surface commands based on signals received from the autopilot flight director system 140 instead of the pilot control transducer signals received from the ACEs. The autopilot flight director system 140 also transmits back-drive signals to a set of back-drive servo motors on a set of leads 142. The back-drive servo motors move the pilot controller 30, the copilot controller 32 and the set of pedals 33 to correspond to the movement of the aircraft, as dictated by the autopilot flight director system 140. This automatic movement of the controls provides a visual and tactile indication to the pilot and copilot of how the autopilot system is operating the aircraft.

The pilot and copilot controls 30, 32, and 33 are also connected to a bank of feel units 180. The roll and yaw feel units 180 provide a fixed force versus displacement relationship so that the force required to move the wheels or pedals increases with the displacement of the control. A variable pitch axis feel is generated by a pitch feel actuator 170. The pitch feel actuator receives signals from the ACEs on a set of leads 171. The pitch feel actuator 170 changes the force versus displacement characteristics of the feel units 180 via a mechanical link 172. The pitch feel actuators 170 program pitch feel forces that are proportional to the speed of the aircraft. A roll and yaw trim actuator block 190 are connected to the roll and yaw feel units via a mechanical link 191. The pilot and copilot can change the zero force position of the wheel or pedals through trim commands input to the trim actuators 190.

A set of switches (not shown in FIG. 4) generate a stabilizer trim position signal, which is transmitted to the ACEs on a lead 195. The ACEs then transmit the stabilizer trim signal to the primary flight computers over data busses 40, 42 and 44. In response, the primary flight computers generate a stabilizer surface command that is transmitted back to the ACEs. The ACEs in turn transmit this command on a lead 192 to the stabilizer trim actuator (not shown), which controls the movement of the stabilizer flight control surface.

Finally, a standby attitude air data and inertial reference unit 145 is also coupled to the data busses 40, 42 and 44 via a set of leads 151 to provide fail-safe redundancy should air data and inertial reference unit 145 fail.

Figure 5:
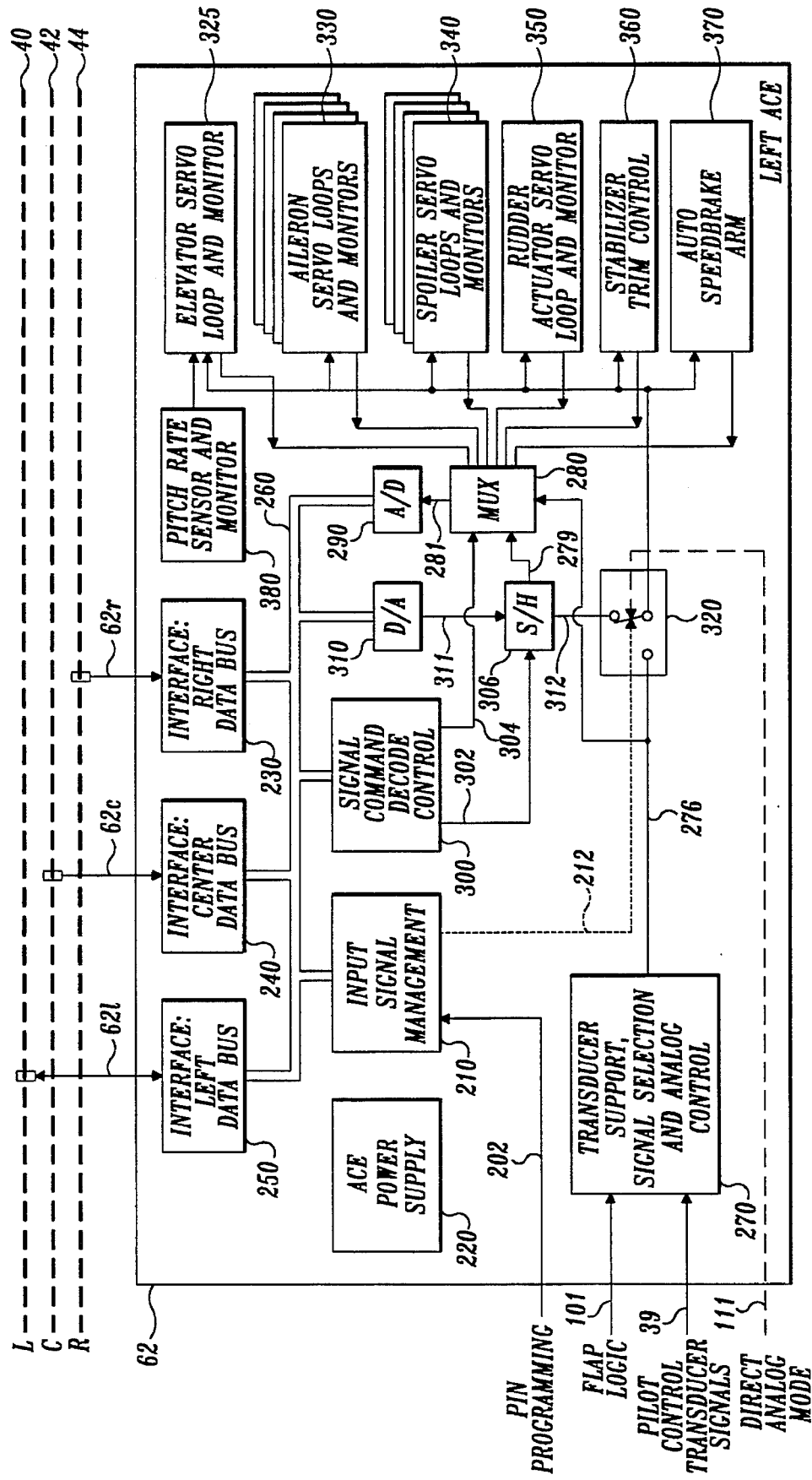
FIG. 5 is a block diagram of an actuator controller electronic unit (ACE) included within the fly-by-wire control system according to the present invention.

FIG. 5 shows the internal components of an actuator controller electronics unit (ACE) 62. As discussed above, the actuator controller electronics units receive the pilot control transducer signals produced by the sets of pilot control transducers and execute the flight surface commands generated by the primary flight computers in order to control the movement of a set of flight control surfaces. Each of the actuator controller units (ACEs) included within the fly-by-wire system according to the present invention are interchangeable. Pin programming signals are applied to an input signal management block 210 within the ACE 62 on a set of leads 202 to identify the flight control channel of the fly-by-wire system in which the ACE is inserted. The ACE 62 has an internal power supply 220 that is connected to an independent power bus. The ACE 62 further includes a right data bus interface 230, a center data bus interface 240, and a left data bus interface 250 that connect the ACE 62 to the right data bus 44, the center data bus 42 and the left data bus 40, respectively. Only one of the three data bus interfaces is bidirectional such that the ACE 62 can transmit, as well as receive, data from the data bus. The remaining data bus interfaces are "receive only" such that the ACE can receive data but not transmit data to those data buses. The ACE 62 further includes an internal data bus 260 over which data within the ACE are internally routed.

The pilot control transducer signals generated by the banks of pilot control transducers 36 and 38 shown in FIG. 3 are applied via lead 39 to a block 270, which provides transducer support, signal selection, and analog control of the flight surfaces as will be described below. The transducer support and signal selection block 270 also receives the flap logic discretes over the lead 101 from the flap logic blocks 100a and 100b shown in FIG. 4. Included within the transducer support and signal selection block 270 is circuitry to excite the pilot control transducers and demodulate the pilot control transducer signals received from them, as well as circuitry for selecting the pilot control transducer signals generated by either the pilot control transducers or the copilot's control transducers when the aircraft is being flown in the direct analog mode.

After receiving the pilot control transducer signals on the lead 39, the transducer support and signal selection block 270 transmits the pilot control transducer signals over a set of leads 276 to a multiplexer 280, which is coupled to an analog-to-digital (A/D) converter 290 by a lead 281. The A/D converter 290 converts the pilot control transducer signals from an analog format to a digital format and applies the digitized pilot control transducer signals to the internal data bus 260 for transmission to a primary flight computer over the left data bus 40. The internal data bus 260 is connected to the left data bus 40 via the left data bus interface 250 and the bidirectional link 62*l*.

In the primary flight computer (not shown in FIG. 5) the pilot control transducer signals are combined with data obtained from the air data and inertial reference unit 145 (not shown) using advanced control laws to produce a set of flight surface commands that are used by the ACE 62 to control a set of flight control surfaces on the aircraft. The set of flight surface commands are transmitted from the primary flight computer to the ACE 62 via the left data bus 40, the left data bus interface 250 and the bidirectional link 62*l*. The set of flight surface commands received by the ACE 62 are buffered in a signal command decode control block (SCDC) 300, before being converted from a digital format to an analog format in a digital-to-analog (D/A) converter 310. As will be further described below, the SCDC block 300 controls a plurality of sample and hold circuits 306 using control signals transmitted on a set of leads 302. The SCDC block 300 also controls the operation of the multiplexer 280 using control signals transmitted on a lead 304.

A switch 320 is provided to selectively connect a plurality of servo loops that control the flight control surfaces to receive either the analog flight surface commands output from the sample and hold circuits 306, or to receive the pilot control transducer signals generated by the banks of pilot control transducers from a lead 276. The position of switch 320 is controlled by the direct analog mode switch 110, shown in FIG. 4, which is coupled to the switch 320 by a lead 111, as well as by the input signal management block 210, which controls switch 320 with signals on lead 212.

When the fly-by-wire system is operated in the direct analog mode, switch 320 is connected so that a plurality of servo loops 325, 330, 340, 350, 360 and 370 are connected to lead 276 instead of the output of the sample and hold circuits 306. In the direct analog mode, the set of flight control surfaces are controlled directly in response to the pilot control transducer signals generated by the pilot control transducers as will be described. If the input signal management block 210 determines that the flight surface commands generated by the primary flight computers are invalid, or that there is a problem with all of the primary flight computers or with the data busses, the input signal management block 210 causes the switch 320 to connect the input of the servo loops to the lead 276 so that the fly-by-wire system operates in the direct analog mode.

The ACE 62, which is shown in FIG. 5 for illustrative purposes as being in the left flight control channel of the fly-by-wire system, receives flight surface commands not only from the control channel's primary flight computer (i.e., the left primary flight computer), but also from the center and right primary flight computers using the center data bus interface 240 and right data bus interface 230, respectively. The left data bus 40 is the primary source of the flight surface commands for the left ACE 62. The center data bus 42 is the primary source of the flight surface commands for the center ACE and the fight data bus 44 is the primary source of the flight surface commands for the fight ACE. If the input signal management signal block 210 detects a failure in the data received from the primary data bus, the input signal management block will change the data bus from which the ACE receives its flight surface commands. If all the primary flight computers or all the data busses have failed, the input signal management block will change the position of the switch 320 so that the ACE is operated in the direct analog mode.

Each ACE in the fly-by-wire system controls the movement of a set of flight control surfaces by applying the flight control surface commands to the plurality of servo loops, each of which controls a hydraulic actuator connected to one of the flight control surfaces. Each ACE includes an elevator servo loop 325 that controls one hydraulic actuator on the elevator, an aileron servo loops 330 that controls hydraulic actuator on the ailerons, a set of spoiler servo loops 340 that control the position of some of the spoiler surfaces on the aircraft, a rudder servo loop 350, which controls a hydraulic actuator connected to the rudder of the aircraft, a stabilizer trim control 360, which controls a hydraulic actuator to move the stabilizer, and an auto speedbrake arm or control actuator 370 that controls the operation of an auto speedbrake actuator. Also included with the ACE is a pitch rate sensor and monitor 380 that provides a pitch rate damping input to the elevator servo loop when the fly-by-wire system is operated in the direct analog mode. Because the elevator flight control surfaces are among the most important flight control surfaces on the aircraft, steps are taken by the present invention to ensure that the elevators operate properly under all conditions.

Figure 6:
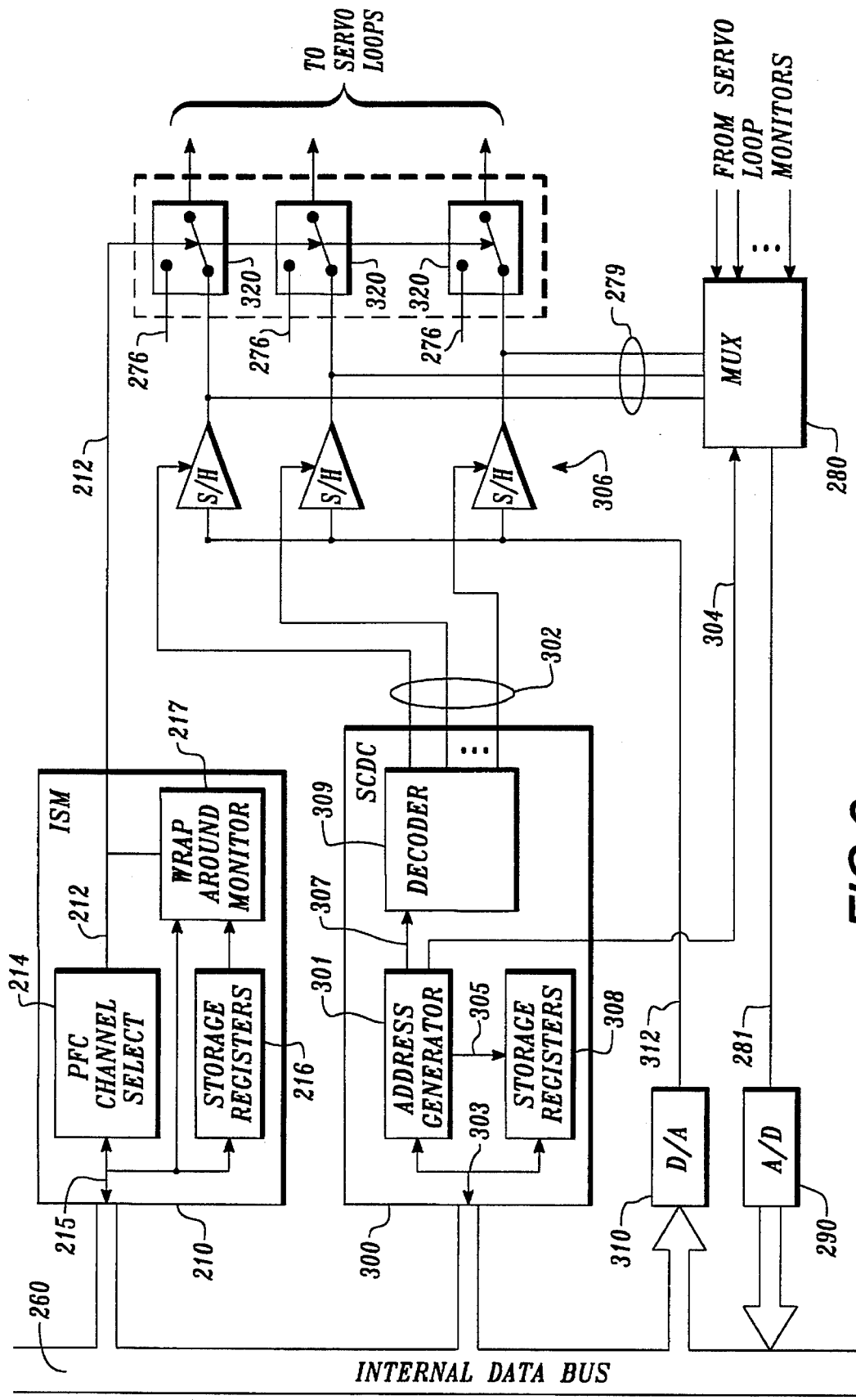
FIG. 6 is a more detailed block diagram of an actuator controller electronics unit (ACE)

FIG. 6 is a block diagram showing the operation of the input signal management (ISM) block 210 and the signal command decode control (SCDC) block 300 as shown in FIG. 5. Briefly, the input signal management block 210 serves to determine whether the set of flight surface commands received from each of the primary flight computers (not shown) are valid, as well as to select which set of flight control surface commands that are used to control the servo loops associated with a particular ACE. Also, the input signal management block 210 determines whether the D/A converter 310, the A/D converter 290 and the internal data bus 260 are operating properly. If the input signal management block determines that there is a malfunction of all the primary flight computers, the data busses, the ACE's D/A or A/D converters or the internal data bus, then the input signal management block 210 causes the switch 320 to connect the servo loops to the lead 276 such that the fly-by-wire system operates in the direct analog mode.

The signal command decode control (SCDC) block 300 receives and stores the sets of flight surface commands generated by each of the primary flight computers and applies a selected set of flight surface commands to the servo loops associated with that particular ACE. Which set of flight surface commands to be used is determined by a primary flight computer (PFC) channel select block 214 that is included in ISM block 210.

When a primary flight computer transmits its set of flight surface commands, a series of cyclic redundancy check (CRC) words are included. The CRC words are used by primary flight computer channel select block 214 to determine whether the data sent are valid. Normally, each ACE selects the set of flight surface commands generated by the primary flight computer within that ACE's flight control channel to control the flight control surfaces. For example, left ACE 62 generally uses the flight surface commands generated by left primary flight computer 64. However, if the CRC words included in the flight surface commands received from the left primary flight computer indicate that the flight surface commands are invalid, the PFC channel select block 214 selects a set of flight surface commands generated by one of the other primary flight computers.

After selecting the set of flight surface commands, the PFC channel select block 214 transmits a signal to SCDC block 300 indicating which set of flight surface commands are to be used by the ACE. The SCDC block 300 receives the sets of flight surface commands from all the primary flight computers and stores them in a block of storage registers 308. An address generator 301 contained within SCDC block 300 receives the signal from the PFC channel select block 214 indicating which set of commands to use to control the servo loops associated with the ACE and then sends a signal on a lead 305 to storage registers 308 so that the selected set of flight surface commands are applied to the digital-to-analog (D/A) converter 310. The flight surface commands are converted from a digital format to an analog format by the D/A converter 310. The analog flight surface commands are then applied to the sample and hold circuits 306. A decoder circuit 309 also receives the address signals on a lead 307, which cause the decoder circuit to activate the appropriate sample and hold circuit 306, so that the analog flight surface command output from D/A converter 310 is applied to the correct servo loop.

As stated above, the position of switch 320 can be selected by the pilot or copilot with direct mode switch 110 (not shown) or by the input signal management block 210. If the PFC channel select block 214 determines that all of the primary flight computers (PFCS) are sending invalid data or no data at all, then the switch 320 is toggled by the ISM block 210 so that the servo loops are connected to receive the pilot control transducer signals directly on the lead 276. Additionally, the ISM block 210 toggles switch 320 if a wrap-around monitor 217 determines there is a malfunction of the D/A converter 310 or the A/D converter 290 within the ACE.

The wrap-around monitor 217 checks the operation of the D/A converter 310 and A/D converter 290. As the flight surface commands are received by the ACE, the commands are stored in a set of storage registers 216 contained within ISM block 210. As the set of flight surface commands is converted from digital-to-analog in D/A converter 310, and applied through the set of sample and hold circuits 306 to the switches 320, a multiplexer 280 is selected such that the flight surface commands are reconverted from an analog format back to a digital format in the A/D converter 290. The reconverted flight surface commands are transmitted from the A/D converter 290 to the storage registers 216 via the internal data bus 260. The wrap-around monitor 217 then compares the reconverted digital flight surface commands with the original flight surface commands also stored in the storage registers 216. If the two sets of flight control surface commands do not agree within a predetermined error margin, the wrap-around monitor 217 declares an error within the ACE and generates a signal on the lead 212 that causes switches 320 to supply the servo loops with the pilot control transducer signals.

The multiplexer 280 is also used to receive servo loop status signals and other actuator information for conversion to a digital format by A/D converter 290 and transmitted to the primary flight computers.

Figure 7:
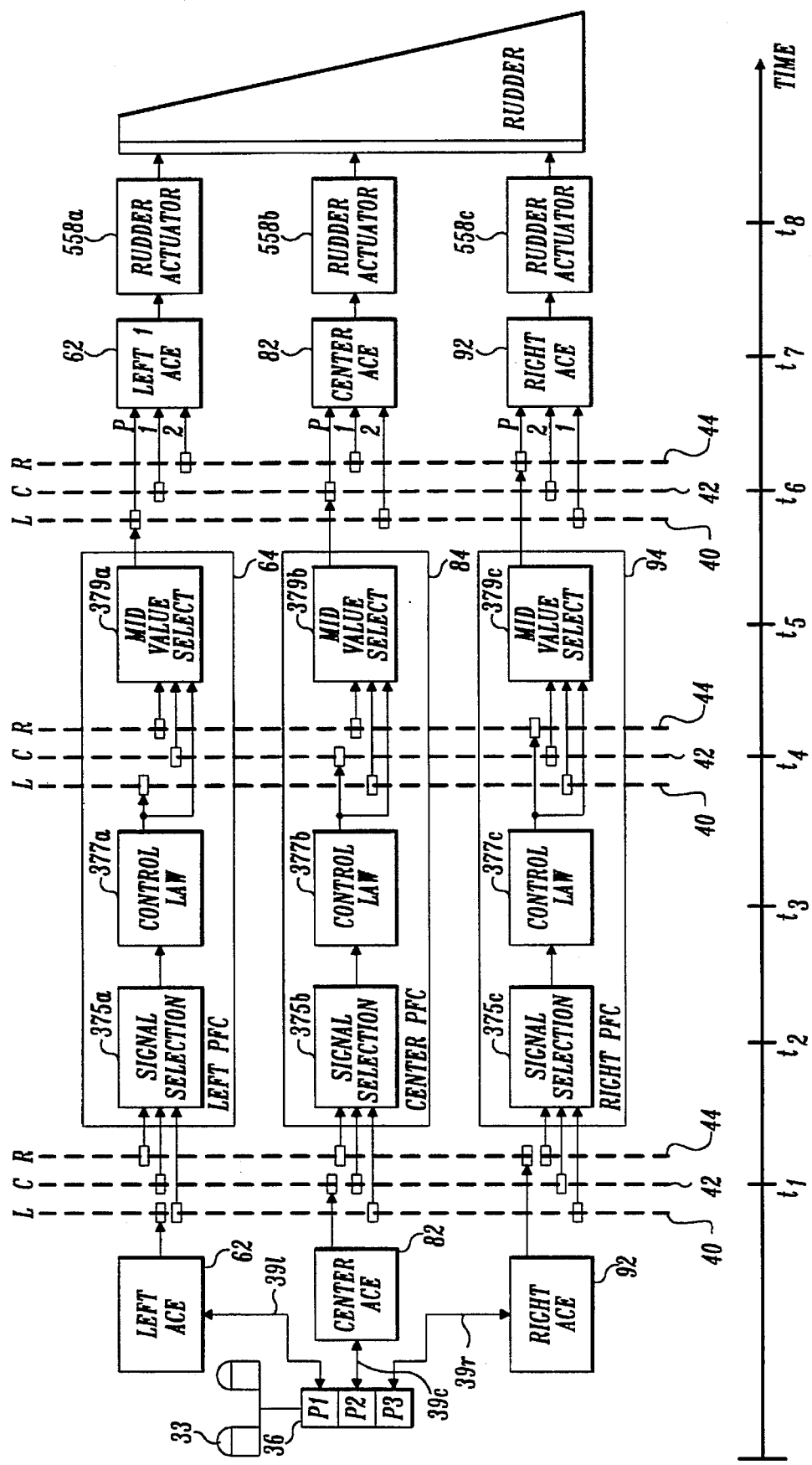
FIG. 7 is a flow chart illustrating the logic used by the fly-by-wire system according to the present invention to control the movement of an individual flight control surface on the aircraft.

FIG. 7 is a flow chart that illustrates, by way of example, how the fly-by-wire system according to the present invention safely controls the position of a rudder flight control surface 558 using redundant primary flight computers, ACEs and hydraulic actuators. In this example, the pilot moves a control (the rudder pedals) to create a signal that is analyzed by the primary flight computers and used to generate a flight surface command that moves the rudder.

The pedals 33 are coupled to the bank of pilot control transducers 36, which includes a set of individual pedal transducers P1, P2, and P3. Each of the pedal transducers provides one of the ACEs with a pedal transducer signal that is proportional to the position of the pedals 33. Each ACE 62, 82, and 92 then transmits the pedal transducer signal received from one of the individual pedal transducers to one of the data busses 40, 42, and 44. Specifically, ACE 62 transmits the pedal transducer signal from its associated pedal transducer P1 over left data bus 40; ACE 82 transmits the pedal transducer signal received from its associated pedal transducer P2 over center data bus 42; and ACE 92 transmits the pedal transducer signal from its associated pedal transducer P3 over right data bus 44. After the pedal transducer signals are applied to the data busses, each of the primary flight computers 64, 84, and 94 selects from pedal transducer signals received on the data busses one set of the pedal transducer signals in order to generate a flight surface command that will move the rudder.

Again, because each of the flight control channels operates in substantially the same way, the following description is directed solely to the left flight control channel to simplify the discussion. After a time $t_1$, when the ACEs transmit the pedal transducer signals on the data busses, the left primary flight computer 64 receives the pedal transducer signals from each of the three data buses 40, 42, and 44. At a time $t_2$, the left primary flight computer 64 selects one of the pedal transducer signals received from one of the three ACEs in a block 375a to use in generating a set of flight surface commands. The center primary flight computer 84 and right primary flight computer 94 perform the same operation in blocks 375b and 375c, respectively, at time $t_2$. Which particular pedal transducer signal is selected in block 375a is based on the selection of the middle value pedal transducer signal according to voting rules that are well known to those of ordinary skill in the aircraft control art. All other data received by the primary flight computers on the data busses such as air and inertial data are voted and selected in a similar manner.

After selecting the pedal transducer signal from one of the three ACEs, left primary flight computer 64 generates a set of proposed flight surface commands at a time $t_3$ in a control law block 377a. This is accomplished by combining the selected pedal transducer signals with data obtained from the aircraft air data and inertial reference system (not shown) in accordance with predefined control laws for the aircraft. The actual control laws used are derived using standard control law theories and empirical data collected while testing the type of aircraft on which the fly-by-wire system according to the present invention is being used.

After generating the set of proposed flight control surface commands in block 377a, the left primary flight computer 64 transmits the set of proposed commands over the data bus 40, while the center and right primary flight computers 84 and 94 transmit their sets of proposed flight surface commands on the center and right data busses 42, and 44, respectively, at a time $t_4$. After transmitting the proposed sets of flight surface commands to the data busses, the left primary flight computer 64 compares the set of proposed flight surface commands it has generated with the proposed flight surface commands generated by each of the other primary flight computers 84 and 94. In a mid-value select block 379a, the left primary flight computer 64 selects the middle value of each of the flight surface commands at a time $t_5$. After block 379a, at a time 16, the left primary flight computer 64 transmits the selected middle values of the flight surface commands over the left data bus 40, while the center and right primary flight computers transmit their selected middle value flight surface commands on the center and right data busses 42 and 44. At a time $t_7$, the ACEs 62, 82 and 92 receive the sets of flight surface commands generated by each of the primary flight computers 64, 84, and 94. At a time $t_8$, the left ACE 62 selects one of the sets of flight surface commands generated by one of the three primary flight computers in accordance with the signal select function of the input signal management block 210 shown in FIG. 6 and described above. Once the ACE 62 has selected a set of flight surface commands, it applies the selected set of flight surface commands to a servo loop, which controls a rudder actuator 558a that moves the rudder on the aircraft. The operation of the center primary flight computer 84 and the right primary flight computer 94 are the same as that of the left primary flight computer 64 described above and, therefore, need not be discussed.

Figure 8:
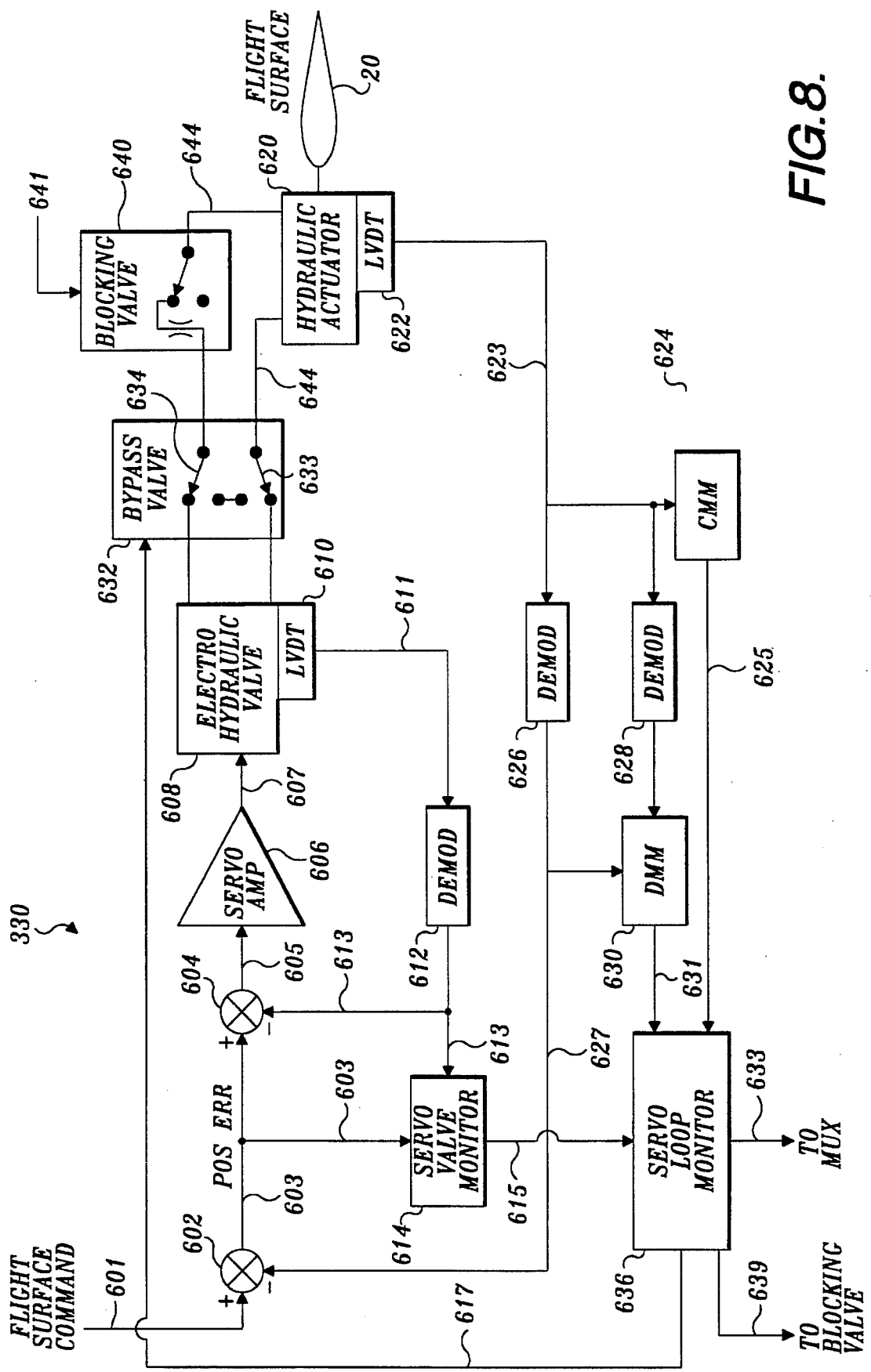
FIG. 8 is a diagram of a servo loop for an individual flight control surface and a servo loop monitor that determines whether the servo loop is operating properly.

FIG. 8 is an exemplary control loop diagram of a servo loop control including a power control unit that is controlled by an individual ACE to move a flight control surface 20. The servo loop control shown generally at 330 uses a flight surface command to control a hydraulic actuator that is connected to one of the individual flight control surfaces 20, e.g., an aircraft aileron. The flight surface command is applied to a lead 601 that is connected to a summation block 602. The summation block 602 subtracts an actuator position signal on a lead 627 from the flight surface command on lead 601. The actuator position signal is proportional to the position of a hydraulic actuator 620 and indicates the position of the flight control surface 20. The actuator position signal is produced by a linear variable differential transformer (LVDT) 622 that is connected to monitor the position of the hydraulic actuator 620. A position error signal representative of the difference between the flight surface command and the actuator position signal is produced and conveyed on a lead 603 to indicate the distance that the hydraulic actuator must be moved to be at the position dictated by the flight surface command.

The position error signal is applied via the lead 603 to a second summation block 604, the output of which drives a servo amplifier 606. The output of servo amplifier 606 is applied on a lead 607 to drive an electrohydraulic valve 608. The electrohydraulic valve 608 controls the flow of pressurized hydraulic fluid to the hydraulic actuator 620, which in turn moves the flight control surface 20. An LVDT position sensing transducer 610 is coupled to the electrohydraulic valve 608 and generates a valve position signal that is proportional to the position of electrohydraulic valve 608. The output signal of the LVDT 610 is coupled to a demodulator 612 via a lead 611. The demodulator 612 provides a demodulated valve position signal, which is fed back to summation block 604 via lead 613 to complete a servo loop for electrohydraulic valve 608. The LVDT 622 similarly produces a signal proportional to the position of the hydraulic actuator 620 that is conveyed on a lead 623 to a demodulator 626. The demodulator 626 produces a demodulated actuator position signal and feeds the signal to the summation block 602 to complete the servo loop for hydraulic actuator 620.

The servo loop control 330 also includes a servo loop monitor block 636, which monitors the operation of the two servo loops used in controlling the operation of the electrohydraulic valve 608 and the hydraulic actuator 620. A servo valve monitor 614 receives the demodulated valve position signal on a lead 613 from the demodulator 612 and compares it to a model valve position signal that is generated as a function of the position error signal supplied to the servo valve monitor from lead 603. By comparing the valve position signal to the model valve position signal, the servo valve monitor 614 determines if the electrohydraulic valve 608 is responding correctly to the position error signal on lead 603. If the servo valve monitor 614 determines that the electrohydraulic valve 608 is not operating properly, it produces an error signal that is sent to a servo loop monitor 636 on a lead 615. The use of valve modeling to determine whether the electrohydraulic valve 608 is operating correctly is well known to those skilled in the aircraft control art.

Upon receipt of a failure signal, the servo loop monitor 636 sends a valve open signal on a lead 617 to a bypass valve 632. In response to the valve open signal, the bypass valve 632 opens a fluid valve 633 and fluid valve 634 and thus interrupts the flow of hydraulic fluid from the electrohydraulic valve 608 to the hydraulic actuator 620. When the fluid valves 633 and 634 are open, the hydraulic fluid that moves the hydraulic actuator 620 is able to flow around a closed path 644. This closed path enables the flight control surface 20 to be moved by another hydraulic actuator (not shown) as will be described below. In addition to signalling the bypass valve 632, the servo loop monitor 636 also sends a servo loop error signal to the multiplexer 280 shown in FIG. 6, which in turn transmits the servo loop error signal to the primary flight computers to alert the pilot of the malfunction.

A demodulator monitor 630 checks the operation of demodulator 626 by comparing the output signal of demodulator 626 with the output signal of a second demodulator 628. The second demodulator 628 is connected in parallel with demodulator 626 and provides a second demodulated output signal from the LVDT 622 to the demodulator monitor 630. If the output signals from demodulators 626 and 628 do not agree within a predetermined limit of error, the demodulator monitor 630 sends an error signal to servo loop monitor 636. In response to the error signal, the servo loop monitor 636 causes the bypass valve 632 to open the fluid valve 633 and 634.

A common mode monitor 624 also checks the operation of LVDT 622 by monitoring a common mode voltage on lead 623. If the common mode voltage varies significantly from its specified normal range, the common mode monitor 624 sends an error signal to the servo loop monitor via a lead 625. In response, the servo loop monitor causes bypass valve 632 to open the fluid valve 633 and 634, thereby releasing the control that PCU 330 has on flight control surface 20.

In addition to sending a servo loop error signal to the ACE's multiplexer 280 and opening the bypass valve 632, the servo loop monitor 636 transmits a "blocking valve arm" signal to a blocking valve (the same as blocking valve 640, except located in another of the servo loop(s) that controls the other hydraulic actuator(s) connected to move that flight control surface).

Blocking valve 640 prevents the flight control surface 20 from oscillating freely under specific failure conditions. Once the bypass valve 632 opens the fluid valves 633 and 634, the hydraulic actuator is no longer subjected to the force of pressurized hydraulic fluid from the electrohydraulic valve 608 and is free to move. If there are two independent hydraulic actuators connected to the flight control surface, then the other actuator can continue to control position of the flight control surface. However, if the other servo loop that controls the flight control surface were also to fail and its bypass valve were to open, then the flight control surface would be able to swing about freely. If the aircraft were flying at any significant speed, a freely flapping flight control surface could couple with a larger flight surface and result in destructive flutter. Therefore, the blocking valve 640 is needed to lock the position of flight control surface. After a "blocking valve arm" signal is transmitted to the blocking valve 640 from another servo loop monitor, if servo loop 330 should then fail, the bypass valve 632 in that servo loop does not open, but instead goes into a locked or blocking mode. In a blocking mode, the closed path 644 is opened and the hydraulic actuator 620 cannot move freely, thus locking flight control surface in place.

The operation of the servo loop monitors described above is independent of external loads placed on flight control surface 20. By testing the operation of the servo loop in the PCU without reference to the actual position of the flight control surface 20, a further safety feature is added. Because most critical flight control surfaces on the aircraft are moved with at least two hydraulic actuators, each of which is controlled by a different control channel, the servo loop monitors must operate independently of the position of the flight control surface. If the servo loop monitors did not operate independently of the position of the flight control surface, it might be possible that the fly-by-wire system would disengage the wrong hydraulic actuator if one of the actuators had failed. For example, if a conventional command response monitor were used and one actuator failed hardover, the flight control surface would not respond to the flight surface commands from the other healthy actuator. Therefore, a command response monitor would deactivate the healthy activator. This problem is eliminated by testing the elements that control the movement of the flight control surface without regard to the position of the flight control surface itself.

Figure 9:
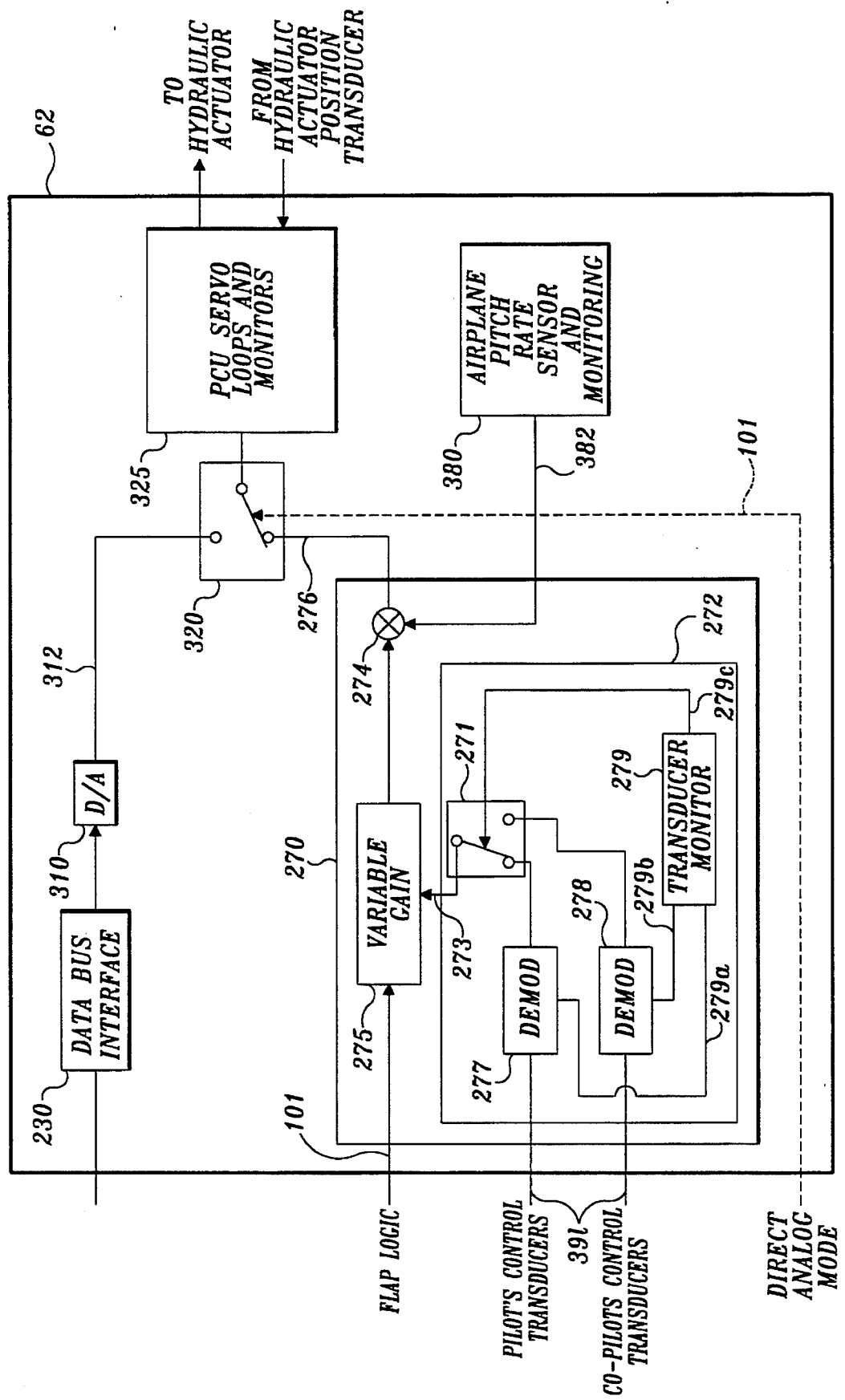
FIG. 9 is a functional block diagram showing how an (ACE) actuator controller unit operates to control the movement of a flight control surface with the assistance of a primary flight computer.

FIG. 9 shows a functional block diagram of how the actuator controller electronics unit ACE 62 controls the movement of a flight control surface (for illustrative purposes, the elevator is selected) in the direct analog mode. When operating in direct analog mode, the set of switches 320 opens to prevent the PCU servo loops and monitors 325 from receiving the flight surface commands generated by the primary flight computers. Instead, the PCU servo loops and monitors 325 receive the pilot control transducer signals generated by the bank of pilot control transducers on leads 39*l*, which are directly connected to the pilot control transducers (not shown). Each PCU servo loop controls the position of one of the flight control surfaces on the aircraft according to the control scheme shown in FIG. 8 with the substitution of a pilot control transducer signal for the flight surface command on lead 60*l*. In addition, when operating in the direct analog mode, the flap position discretes from flap logic blocks 100*a* and 100*b* in FIG. 4 are applied on leads 101 to a variable gain block 275 contained within transducer support and signal selection block 270. Variable gain block 275 alters the gain of the pilot control transducer signals received from the set of pilot control transducers based on formulas that are well known to those skilled in the art of flight controller technology. For the PCU servo loops that control the elevators of the aircraft, an airplane pitch rate sensor and monitoring block 380 further alters the gain of the position control signals before they are applied to the servo loop that control the elevator flight control surface. The airplane pitch rate sensor and monitoring block 380 provides an airplane pitch rate damping signal which is superimposed on the pilot control transducer signals through the summation block 274 via a lead 382. The purpose of the pitch rate damping signal is to provide airplane stability in the pitch axis. The output of summation block 274 represents the sum of the pilot control transducer signals and the pitch rate damping signal used by the ACE 62 to control the set of flight control surfaces when operating in the direct analog mode.

A switch 271 selects the pilot control transducer signals from either the bank of pilot control transducers or the bank of copilot control transducers in response to the output signal of a transducer monitor 279. The transducer monitor 279 tests the operation of these transducers in the same way as the common mode monitor 624 and the demodulator monitor 630 (as shown in FIG. 8). Specifically, the transducer monitor 279 receives the pilot control transducer signals from the bank of pilot control transducers on a lead 279*a*, and from the bank of copilot control transducers on a lead 279*b* to ensure that a pair of demodulators 277 and 278 are working properly and to ensure that the common mode voltage of the pilot control transducers remains relatively constant. The output of the transducer monitor 279 is conveyed on a lead 279*c* to control the position of switch 271.

Figure 10:
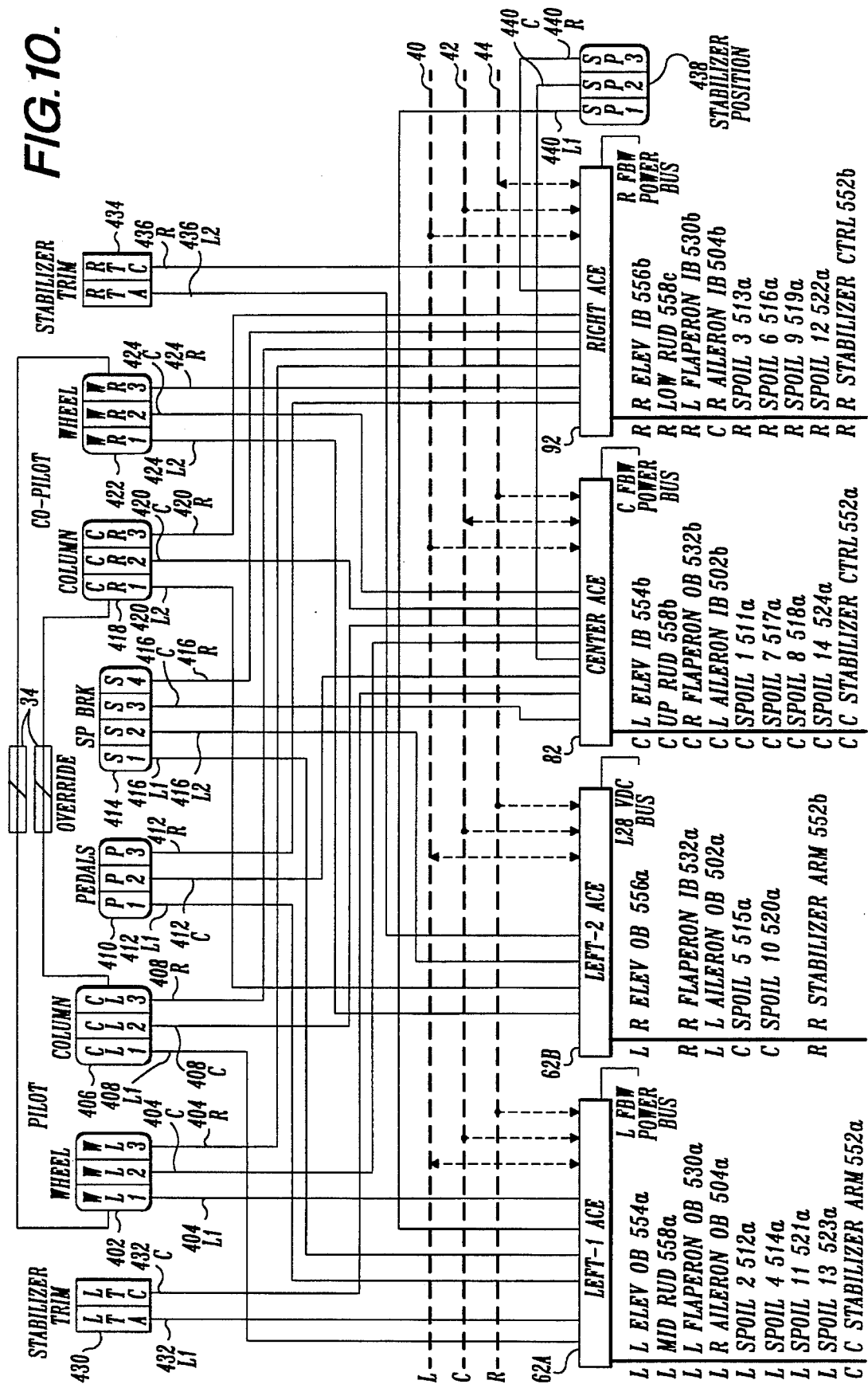
FIG. 10 is a diagram showing the distribution signals from a plurality of pilot control transducers among the actuator controller units contained within the fly-by-wire system.

FIG. 10 shows the distribution of flight control surfaces controlled by a particular ACE, as well as the interconnection between the sets of transducers associated with either the pilot or copilot controllers for a typical aircraft. In general, the controller transducers are distributed to the ACEs such that each actuator will receive an input from its corresponding controller in the direct analog mode. As described above, the pilot's controllers generally comprise a wheel and a column which are connected to a copilot's wheel and column through the jam override device 34. In the preferred embodiment of the fly-by-wire system, the ACE 62 is further divided into a left-1ACE 62A and a left-2ACE 62B. The reason for this redundancy is to provide additional safety and backup to control the aircraft elevators and stabilizer, as will be described. Coupled to the pilot's wheel and column are a set of wheel transducers 402 and a set of column transducers 406, respectively. Wheel transducers 402 comprise three redundant transducers WL1, WL2, and WL3. Each of these wheel transducers generates a control transducer signal that is proportional to the rotational position of the pilot's wheel. Wheel transducer WL1 is connected to the left-1ACE 62A by a lead 404L1; transducer WL2 is connected to the center ACE 82 by a lead 404C; and transducer WL3 is connected to the right ACE 92 by a lead 404R. Similarly, the set of column transducers 406 comprises three transducers CL1, CL2, and CL3, each of which generates a control transducer signal that is proportional to the position of the pilot's column. Transducer CL1 is connected to left-1ACE 62A via a lead 408L1; transducer CL2 is connected to center ACE 82 via a lead 408C; and transducer CL3 is connected to the right ACE 92 by a lead 408R.

A set of pedal transducers 410 provides control transducer signals that are proportional to the position of the pedals to the individual ACEs. The set of pedal transducers further comprises three redundant transducers P1, P2, and P3. Transducer PI is connected to left-1ACE 62A by a lead 412L1; transducer P2 is connected to center ACE 82 by a lead 412C; and transducer P3 is connected to the fight ACE 92 by a lead 412R A set of speed brake transducers 414 is coupled to a speed brake lever that is controllable by both the pilot and copilot. The set of speed brake transducers 414 comprises four redundant transducers S1, S2, S3, and S4. Transducer S1 is connected to the left-1ACE 62A by a lead 416L1; transducer S2 is connected to left-2ACE 62B by a lead 416L2; transducer S3 is connected to center ACE 82 by a lead 416C; transducer S4 is connected to right ACE 92 by a lead 416R.

Connected to the copilot's column is a set of column transducers 418, each of which generates a control transducer signal that is proportional to the position of the copilot's column. The set of column transducers 418 comprise three redundant transducers CR1, CR2, and CR3. Transducer CR1 is connected to left-2ACE 62B via a lead 420L2; transducer CR2 is connected to center ACE 82 by a lead 420C; and transducer CR3 is connected to fight ACE 92 by a lead 420R.

Coupled to the copilot's wheel is a set of wheel transducers 422, which comprises three redundant transducers WR1, WR2, and WR3. Transducer WR1 is connected to the left-2ACE 62B by a lead 424L2; transducer WR2 is connected to center ACE 82 by a lead 424C; and transducer WR3 is connected to the right ACE 92 by a lead 424R. In addition to the pilot's wheel and column controller, both the pilot and copilot are provided with a stabilizer trim controller to adjust a stabilizer flight control surface on the aircraft. Coupled to the stabilizer trim controller is a set of stabilizer trim transducers 430, which includes two redundant transducers LTA and LTC. Transducer LTA is connected to left-1ACE 62A by a lead 432L1. Transducer LTC is connected to the center ACE 82 by a lead 432C. The copilot is also provided with a stabilizer trim controller having coupled thereto a set of stabilizer trim transducers 434. Stabilizer trim transducers 434 include two redundant transducers RTA and RTC. Transducer RTA is connected to left-2ACE 62B, and transducer RTC is connected to right ACE 92 by a lead 436R.

In the fly-by-wire system according to the present invention, before the stabilizer is moved, agreement is required between transducers LTA and LTC or between transducers RTA and RTC. Transducer LTA generates a stabilizer trim "arm" signal, while transducer LTC generates a stabilizer transducer "control" signal. Similarly, transducer RTA 434 generates a stabilizer trim "arm" signal and transducer RTC generates a stabilizer trim "control" signal. Therefore, in order to move the stabilizer, agreement is required between both the stabilizer trim "arm" and "control" signals. The ACE in each of the three control channels, i.e., left-1ACE 62A, center ACE 82, and fight ACE 92 is provided with a position stabilizer signal proportional to the position of the stabilizer trim controller.

A set of stabilizer position transducers 438 comprises three redundant transducers SP1, SP2, and SP3. Transducer SP1 is connected to left-1 ACE 62A by a lead 440L1; transducer SP2 is connected to center ACE 82 by a lead 440C; and transducer SP3 is connected to right ACE 92 by a lead 440R. The stabilizer position signals generated by the transducers SP1, SP2, and SP3 are transmitted by the individual ACEs onto the data busses 40, 42 and 44 for pilot indication via the engine indication and caution alerting box 130 shown in FIG. 4.

The left ACE is divided into two separate channels L1 and L2, so that a failure of the power supply that powers ACE L1 will not affect the operation of ACE L2, as well as to provide additional safety in controlling the aircraft's elevators and stabilizer. Listed in columns of TABLE 1 below are the particular flight control surfaces controlled by each ACE and the hydraulic actuator that moves that flight control surface.

TABLE 1

| Hydraulic System | Flight Control Surface | Actuator |
|---|---|---|
| LEFT-1 ACE | | |
| left | left elevator | 554a |
| left | middle rudder | 558a |
| left | left flaperon | 530a |
| left | right aileron | 504a |
| left | spoiler | 512a |
| left | spoiler | 514a |
| left | spoiler | 521a |
| left | spoiler | 523a |
| center | center stabilizer arm | 552a |
| LEFT-2 ACE | | |
| left | right elevator | 556a |

TABLE 1-continued

| Hydraulic System | Flight Control Surface | Actuator |
|---|---|---|
| right | right flaperon | 532a |
| left | left aileron | 502a |
| center | spoiler | 515a |
| center | spoiler | 520a |
| right | right stabilizer arm | 552b |
| CENTER ACE | | |
| center | left elevator | 554b |
| center | upper rudder | 558b |
| center | right flaperon | 532b |
| center | left aileron | 502b |
| center | spoiler | 511a |
| center | spoiler | 517a |
| center | spoiler | 518a |
| center | spoiler | 524a |
| center | center stabilizer control | 552a |
| RIGHT ACE | | |
| right | right elevator | 556b |
| right | lower rudder | 558c |
| right | left flaperon | 530b |
| center | right aileron | 504b |
| right | spoiler | 513a |
| right | spoiler | 516a |
| right | spoiler | 519a |
| right | spoiler | 522a |
| right | right stabilizer control | 552b |

FIG. 11A shows the disposition of the flight control surfaces on a set of wings 500 on the aircraft. Included on the wings are a set of outboard ailerons 502 and 504, two sets of outboard spoilers 511–515 and 520–524, a set of flaperons 530 and 532, and two sets of inboard spoilers 516–517, 518–519. As will be evident from the above table, most of the flight control surfaces (with the exception of the spoilers) are positioned by two actuators, each of which is controlled by a separate channel of the fly-by-wire system, as well as by a separate hydraulic system. The letters contained within the circles adjacent each actuator shown in FIG. 11A denote the particular ACE that controls that actuator, while the letter contained within the square blocks denote the hydraulic system used by the actuator associated with each flight control surface. The primary emphasis with this distribution of hydraulic power and ACE control of the actuators that move the flight control surfaces is to ensure that any combination of dual hydraulic failure, dual ACE or dual hydraulic and ACE failure does not reduce airplane controllability below a safe level. This distribution also ensures good physical separation between hydraulic systems and ACE control signals is maintained.

FIG. 11B shows the disposition of the aircraft's elevators and stabilizer and the ACEs and hydraulic systems associated therewith. The elevators 554 and 556 are each controlled by two separate hydraulic actuators, which are in turn controlled by different ACEs. In order that a particular ACE control no more than one actuator on both elevator 554 and 556, the left ACE has been further divided into two channels, 62A and 62B. This division and additional redundancy assures that a failure in any one of the four ACEs cannot affect more than one of the actuators that control elevators 554 and 556.

An aircraft stabilizer 552 is controlled by all four Left-1, Left-2, Center and Right ACEs, and uses the center and fight hydraulic systems to provide pressurized hydraulic fluid. The aircraft stabilizer 552 is controlled using the stabilizer trim controls described above. In order to move the stabilizer surface, the stabilizer actuator requires agreement between the flight control surface commands provided to left-1ACE 62A and center ACE 82, or between right ACE 92 and left-2ACE 62B. Should these pairs of signals generated by the ACEs fail to agree, the stabilizer actuator does not enable movement of the stabilizer surface. Agreement is required between two pairs of ACEs before the stabilizer is moved, and the present fly-by-wire system provides this level of fail-safe operation by splitting the left ACE into two channels 62A and 62B. By thus dividing the ACEs, it is assured that a malfunction in one ACE cannot cause the stabilizer surface to move unexpectedly. The stabilizer flight control surface must be controlled properly, since it can adversely affect safe handling of the aircraft if it moves inadvertently, especially at high air speeds.

FIG. 10C shows the configuration of ACEs and hydraulic systems used to control a rudder 558 of the aircraft. Because the rudder is capable of being moved by any one of the three attached hydraulic actuators, it is possible to control the movement of the rudder 558 if any two of the hydraulic systems or any two control channels fail, or if any combination of a one hydraulic system and a one control channel fail. This fail-safe operation applies not only for the rudder flight control, but for every flight control surface on the aircraft. Therefore, the present system can withstand the failure of any two ACEs, or any two hydraulic channels or any combination of one ACE and one hydraulic channel, without loss of ability to safely control the aircraft.

Although the present invention has been disclosed with respect to its preferred embodiment, those skilled in the flight control systems art will realize that changes can be made to the present system without departing from the spirit and scope of the invention. Therefore, it is intended that the scope of the present invention be determined only by reference to the following claims.

The embodiments of the invention in which an exclusive property or privilege is claimed are defined as follows:

1. A fly-by-wire flight control system for an aircraft that monitors the position of pilot controls and produces flight surface commands that control the movement of a plurality of flight control surfaces on the aircraft to adjust the attitude of the aircraft about roll pitch, and yaw directional axes, the system comprising:

(a) a plurality of transducers associated with the pilot controls, each of said plurality of transducers producing a signal indicative of the position of a corresponding pilot control;

(b) a plurality of isolated flight control channels, each of which includes:

(i) a plurality of servo loops assigned to one of the isolated flight control channels of the plurality of isolated flight control channels, each servo loop controlling the movement of a flight control surface on the aircraft such that the plurality of servo loops in the isolated flight control channel operate to control a set of flight control surfaces that together adjust the attitude of the aircraft in the roll, pitch and yaw directional axes;

(ii) an actuator controller electronics unit (ACE) that receives the signals from at least some of the transducers; and (iii) a primary flight computer that is coupled to the ACE and which generates flight surface commands as a function of the signals from the transducers, the ACE for each isolated flight control channel including means for receiving the flight surface commands and for coupling the flight surface commands to the plurality of servo loops, wherein the set of flight control surfaces controlled by each isolated flight control channel is selected so that operation of a single isolated flight control channel is sufficient to fly the aircraft in the event that the remaining isolated flight control channels fail.

2. The fly-by-wire system as in claim 1, wherein the pilot controls are duplicated at both a pilot position and a copilot position, and wherein each ACE further comprises:

signal selection means for selecting the signals from the transducers associated with the pilot controls at one of the pilot and copilot positions to be transmitted by the ACE to the primary flight computer.

3. The fly-by-wire system as in claim 1, wherein each ACE further comprises:

a switch for coupling the signals from the transducers directly to the servo loops, bypassing the primary flight computer, thereby controlling the movement of the set of flight control surfaces without the flight surface commands generated by the primary flight computers.

4. The fly-by-wire system as in claim 3, wherein the switch for applying the signals from the transducers directly to the servo loops is controlled by a pilot or a copilot.

5. The fly-by-wire system as in claim 5, wherein each ACE receives flight surface commands from the primary flight computer in at least one other flight control channel and wherein each ACE further includes means for selecting the flight surface commands that are used to control the movement of the set of flight control surfaces from among those flight surface commands generated by the primary flight computer in its own flight control channel and those received from said at least one other flight control channel.

6. The fly-by-wire system as in claim 5, wherein the means for selecting the flight surface commands that are used to control the movement of the set of flight control surfaces comprises an input signal selection circuit disposed within the ACE.

7. The fly-by-wire system as in claim 6, wherein each ACE includes a digital-to-analog converter that converts the flight surface commands that are selected from a digital format to an analog format, and wherein the input signal selection circuit disposed within the ACE includes a monitor circuit that determines if the set of flight surface commands selected are being converted properly, the monitor circuit comprising:

an analog-to-digital converter that converts the analog flight surface commands back to a digital format, producing test flight surface commands; and a comparator that compares the digital flight surface commands selected to the test flight surface commands, producing an error indication if they are different.

8. The fly-by-wire system as in claim 7, wherein the monitor circuit includes means for controlling the switch that applies the signals from the transducers directly to the servo loops such that, if the selected flight surface commands are not properly coupled to the servo loops, the movement of the flight control surfaces is controlled directly by the signals produced by the transducers associated with the pilot controls.

9. The fly-by-wire system as in claim 1, further comprising a plurality of isolated data busses, wherein all data transferred between the isolated flight control channels are transmitted on the data busses.

10. The fly-by-wire system as in claim 1, wherein each isolated flight control channel includes an independent hydraulic system.

11. The fly-by-wire system as in claim 1, wherein each isolated flight control channel includes an isolated power supply.

12. The fly-by-wire system as in claim 1, wherein the primary flight computer in each isolated flight control channel includes means for selecting signals transmitted by at least one of the flight control channels for use in generating the flight surface commands.

13. The fly-by-wire system as in claim 1, wherein each servo loop comprises:

(a) an electrohydraulic valve that supplies hydraulic fluid to a hydraulic actuator;

(b) a hydraulic actuator position sensor that produces a signal indicative of the position of the hydraulic actuator;

(c) a first demodulator coupled to the hydraulic actuator position sensor; and servo loop monitoring means for determining whether a servo loop that controls the movement of a flight control surface is functioning properly, wherein the servo loop monitoring means comprises:

(i) means for producing a signal indicative of a predicted position of the electrohydraulic valve;

(ii) a sensor for producing a signal indicative of the actual position of the electrohydraulic valve;

(iii) a servo valve monitor that compares the signal indicative of the position of the electrohydraulic valve with the signal indicative of the predicted position of the electrohydraulic valve;

(iv) a common mode monitor that monitors a common mode voltage on the hydraulic actuator position sensor to determine if the position sensor is operating properly; and (v) differential mode monitoring means for determining if the first demodulator coupled to the hydraulic actuator position sensor is operating properly.

14. The fly-by-wire system as in claim 13 wherein the differential mode monitoring means includes:

a second demodulator connected to the hydraulic actuator position sensor; and a comparator that compares a signal from the first demodulator to a signal from the second demodulator, producing an indication of error if said signals are different.

15. The fly-by-wire system as in claim 13, wherein each servo loop further comprises:

a bypass valve that allows a hydraulic actuator to move freely when the flight control surface to which the hydraulic actuator is coupled is moved by a second hydraulic actuator while the hydraulic actuator is inoperative to move the flight control surface.

16. A fly-by-wire flight control system for an aircraft that monitors the position of at least one set of controls duplicated at a pilot position and at a copilot position and produces flight surface commands that control the movement of a plurality of flight control surfaces on the aircraft in response thereto, the system comprising:

(a) a plurality of transducers associated with the controls, each transducer producing a signal indicative of the position of said controls;

(b) a plurality of isolated flight control channels, each of which includes:

(i) an actuator controller electronics unit (ACE) that receives the signals indicative of the position of the controls;

(ii) a primary flight computer coupled to the ACE, which generates flight surface commands based at least in part on the signals, the ACE including means for receiving the flight surface commands and for coupling the flight surface commands to a plurality of servo loops that control the movement of a set of flight control surfaces on the aircraft; and (c) means for selectively applying the signals directly to the servo loops, bypassing the primary flight computer, so that movement of the set of flight control surfaces is controlled without the flight surface commands generated by the primary flight computers.

17. The fly-by-wire system as in claim 16, wherein each ACE further comprises:

signal selection means for selecting the signals from the transducers associated with the controls at one of the pilot and copilot positions for transmission by the ACE to the primary flight computer.

18. The fly-by-wire system as in claim 16, wherein the means for applying the signals from the transducers directly to the servo loops comprises a direct analog mode switch disposed at one of the pilot and copilot positions.

19. The fly-by-wire system as in claim 16, wherein each ACE receives flight surface commands from the primary flight computer in its own flight control channel and from the primary flight computer in at least one other flight control channel, wherein each ACE further includes means for selecting the flight surface commands received that is used to control the movement of the set of flight control surfaces from among said sets of flight surface commands.

20. The fly-by-wire system as in claim 16, wherein each servo loop includes:

servo loop monitoring means for determining whether the servo loop that controls the movement of a flight control surface is operating correctly;

a bypass valve that is controlled by the servo loop monitoring means, which allows a hydraulic valve that moves the flight control surface to move freely when the servo loop monitoring means determines the servo loop is not operating correctly.

21. A method of controlling the position of a plurality of flight control surfaces on an aircraft comprising the steps of:

producing a plurality of transducer signals at both a pilot position and a copilot position, the transducer signals being indicative of control conditions at those positions;

selecting a different set of transducer signals from the plurality of transducer signals for each of a plurality of control channels;

transmitting each selected set of transducer signals to a separate primary flight computer associated with each control channel;

combining the sets of transducer signals in each control channel with data obtained from an air data and inertial reference system to produce a corresponding plurality of sets of flight surface commands; and transmitting the sets of flight surface commands from the primary flight computers to a corresponding plurality of actuator controller units (ACEs);

selecting within an ACE a set of flight surface commands from among the plurality of sets; and applying the selected set of flight surface commands to a plurality of servo loops to control a corresponding set of flight control surfaces on the aircraft.

22. The method of claim 21, further comprising the step of:

monitoring each of the servo loops to determine if each servo loop is operating properly and opening a bypass valve in a servo loop if that servo loop is not operating properly.

23. The method of claim 21, further comprising the step of:

applying the transducer signals directly to the plurality of servo loops in the event that the primary flight computers that generate the flight surface commands fail.

24. A fly-by-wire fight control system for an aircraft that monitors the position of pilot controls and produces flight surface commands that control the movement of a plurality of flight control surfaces on the aircraft for adjusting the attitude of the aircraft in a plurality of different directional axes, the system comprising:

(a) a plurality of transducers associated with the pilot controls, each of said plurality of transducers producing a signal indicative of the position of a corresponding pilot control;

(b) a plurality of isolated flight control channels, each of which includes:

(i) a plurality of servo loops assigned to the isolated flight control channel that together control the movement of a set of flight control surfaces on the aircraft;

(ii) an actuator controller electronics unit (ACE) that receives the signals from at least some of the transducers; and (iii) a primary flight computer that is coupled to the ACE and which generates flight surface commands as a function of the signals from the transducers, the ACE for each flight control channel including means for receiving the flight surface commands from two or more primary flight computers in different isolated flight control channels, for selecting the flight surface commands that are used to control the movement of the set of flight control surfaces from those generated by the two or more primary flight computers and for coupling the selected flight surface commands to the plurality of servo loops, wherein the set of flight control surfaces controlled by each isolated flight control channel is selected so that operation of a single isolated flight control channel is sufficient to fly the aircraft in the event that the remaining isolated flight control channels fail.

25. The fly-by-wire control system of claim 24, wherein the plurality of flight control surfaces on the aircraft includes at least a rudder, a pair of elevators, a pair of ailerons, a plurality of symmetrically located spoiler surfaces and a stabilizer and wherein the set of flight control surfaces controlled by the plurality of servo loops assigned to each isolated flight control channel controls the movement of the rudder, one of the pair of elevators, one of the pair of ailerons and at least one pair of symmetrically located spoiler surfaces.

26. A fly-by-wire flight control system for an aircraft that monitors the position of pilot controls and produces flight surface commands that control the movement of a plurality of flight control surfaces on the aircraft, the system comprising:

(a) a plurality of transducers associated with the pilot controls, each of said plurality of transducers producing a signal indicative of the position of a corresponding pilot control;

(b) a plurality of isolated flight control channels, each of which includes:

(i) a plurality of servo loops assigned to one of the isolated flight control channels of the plurality of isolated flight control channels, each servo loop controlling the movement of a flight control surface on the aircraft and wherein the flight control surfaces controlled by the plurality of servo loops that are assigned to the isolated flight control channel define a set that includes at least a rudder surface, an aileron surface, and at least one pair of symmetrically located spoiler surfaces;

(ii) an actuator controller electronics unit (ACE) that receives the signals from at least some of the transducers; and (iii) a primary flight computer that is coupled to the ACE and which generates flight surface commands as a function of the signals from the transducers, the ACE for each isolated flight control channel including means for receiving the flight surface commands and for coupling the flight surface commands to the plurality of servo loops, wherein the set of flight control surfaces controlled by each isolated flight control channel is selected so that operation of a single isolated flight control channel is sufficient to fly the aircraft in the event that the remaining isolated flight control channels fail.

* * * * *

UNITED STATES PATENT AND TRADEMARK OFFICE
CERTIFICATE OF CORRECTION

PATENT NO.    : 5,493,497
DATED         : February 20, 1996
INVENTOR(S)   : H. Buus It is certified that error appears in the above-indentified patent and that said Letters Patent is hereby corrected as shown below:

| COLUMN | LINE | |
|---|---|---|
| 1 | 61 | "modem" should read —modern— |
| 7 | 23 | "(AIMS)120" should read --(AIMS) 120-- |
| 8 | 16 | "(ACE)62" should read --(ACE) 62-- |
| 9 | 53 | "fight" should read --right-- |
| 18 | 62 | "fight" should read --right-- |
| 20 (Claim 5, | 22 line 1) | "5," should read --1,-- |
| 21 (Claim 15, | 42 line 1) | "14," should read --13,-- |
| 23 (Claim 24, | 6 line 1) | "fight" should read --flight-- |

Signed and Sealed this

Sixteenth Day of July, 1996

Attest:

BRUCE LEHMAN

Attesting Officer                Commissioner of Patents and Trademarks